(12) United States Patent
Kodama et al.

(10) Patent No.: US 7,568,820 B2
(45) Date of Patent: Aug. 4, 2009

(54) LIGHT-CONTROLLING SHEET AND SURFACE ILLUMINANT UNIT

(75) Inventors: Daijiro Kodama, Mihara (JP); Masahiro Goto, Mihara (JP); Wataru Tokuhara, Hiroshimaken (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 63 days.

(21) Appl. No.: 11/539,433

(22) Filed: Oct. 6, 2006

(65) Prior Publication Data

US 2007/0109766 A1 May 17, 2007

(30) Foreign Application Priority Data

| Oct. 14, 2005 | (JP) | ............................ 2005-300456 |
| Nov. 16, 2005 | (JP) | ............................ 2005-331471 |
| Jun. 30, 2006 | (JP) | ............................ 2006-181116 |

(51) Int. Cl.
   *F21V 5/00* (2006.01)
(52) U.S. Cl. .................... 362/330; 362/606; 362/617
(58) Field of Classification Search ................ 326/620, 326/617–619, 614, 330, 97, 29, 30; 349/62, 349/64, 65, 70; 362/606
   See application file for complete search history.

(56) References Cited

U.S. PATENT DOCUMENTS

| 2,551,954 | A | * | 5/1951 | Lehman ..................... 362/333 |
| 4,791,540 | A | | 12/1988 | Dreyer, Jr. et al. |
| 5,552,907 | A | * | 9/1996 | Yokota et al. ................. 349/62 |
| 5,592,332 | A | * | 1/1997 | Nishio et al. ................ 359/619 |
| 5,594,830 | A | * | 1/1997 | Winston et al. ............. 385/146 |
| 6,075,649 | A | * | 6/2000 | Naito ......................... 359/619 |
| 6,280,063 | B1 | * | 8/2001 | Fong et al. .................. 362/333 |
| 6,611,303 | B1 | * | 8/2003 | Lee et al. ...................... 349/65 |
| 6,666,569 | B2 | * | 12/2003 | Obata ......................... 362/339 |
| 6,874,902 | B2 | * | 4/2005 | Yamashita et al. .......... 362/620 |
| 7,168,840 | B2 | * | 1/2007 | Leu et al. .................... 362/612 |
| 7,255,456 | B2 | * | 8/2007 | Yao et al. .................... 362/225 |
| 7,303,323 | B2 | * | 12/2007 | Choi et al. .................. 362/606 |
| 7,316,498 | B2 | * | 1/2008 | Olczak ....................... 362/607 |
| 2003/0067682 | A1 | | 4/2003 | Hwang |
| 2005/0254771 | A1 | | 11/2005 | Yamashita et al. |
| 2006/0279953 | A1 | | 12/2006 | Kim et al. |

FOREIGN PATENT DOCUMENTS

| JP | 56-165134 A1 | 12/1981 |
| JP | 63-318003 A1 | 12/1988 |

(Continued)

*Primary Examiner*—Sandra L O'Shea
*Assistant Examiner*—Gunyoung T Lee
(74) *Attorney, Agent, or Firm*—Burr & Brown

(57) ABSTRACT

The present invention is a light-controlling sheet for making light emitted from light sources uniform and/or converging the light. The light-controlling sheet includes a lens part having a large number of rod-like unit lenses arranged in parallel, with a lens surface of each unit lens facing to the light-exiting side. A cross section of the lens surface of each rod-like unit lens taken perpendicularly to the longitudinal direction of the unit lens is asymmetrical. The lens surface of each unit lens has a flat surface part in the shape of a flat surface, and a curved surface part in the shape of part of a cylindrical surface.

10 Claims, 15 Drawing Sheets

FOREIGN PATENT DOCUMENTS

| | | |
|---|---|---|
| JP | 05-119703 A1 | 5/1993 |
| JP | 06-347613 A1 | 12/1994 |
| JP | 08-062428 A1 | 3/1996 |
| JP | 11-242219 A1 | 9/1999 |
| JP | 3188430 B2 | 5/2001 |
| JP | 2004-111352 | 4/2004 |
| KR | 10-2003-0030224 | 4/2003 |
| KR | 10-2006-0081312 | 7/2006 |
| KR | 10-2006-0128139 | 12/2006 |
| WO | WO 94/20871 A1 | 9/1994 |

* cited by examiner

LIGHT-CONTROLLING SHEET AND SURFACE ILLUMINANT UNIT

FIELD OF THE INVENTION

The present invention relates to a light-controlling sheet useful in illuminating a liquid crystal display or the like, and to a surface illuminant unit comprising the light-controlling sheet.

BACKGROUND OF THE INVENTION

Various types of surface illuminant units have been proposed and put into practical use as surface illuminants for illuminating transmission type liquid crystal displays, etc. from their rear. Surface illuminant units are classified in two principal types, edge light type and direct type. The surface illuminant units of these two types are different in the mode of conversion of a non-surface illuminant into a surface illuminant.

For example, in a surface illuminant unit of direct type, cold cathode ray tubes arranged in parallel are used to illuminate a transmission type display element, such as an LCD panel, from its rear. The cold cathode ray tubes and the transmission type display element such as an LCD panel are properly spaced, and a diffuser and a combination of two or more optical sheets for converging light are placed in this space.

Such a conventional transmission type display is poor in light-converging properties although the number of optical sheets required is great. In order to compensate for the light-converging properties, LCD panels have been improved so that even obliquely entering light produces high-quality images on the LCD panels.

However, this way of improving LCD panels is disadvantageous in that it causes reduction in optical efficiency and that it makes the structure of LCD panels complex, which leads to increase in cost.

In particular, the light intensity on (the brightness of) an LCD panel tends to become non-uniform (non-uniformity of brightness) depending on the distance from cold cathode ray tubes (whether a certain point on an LCD panel is close to a cold cathode ray tube or to the space between cold cathode rays tubes arranged in parallel). In order to prevent such non-uniformity of brightness, if the distance between the cold cathode ray tubes and the LCD panel is made greater, the display inevitably has a greater thickness, and if the degree to which light is diffused is increased, or the LCD panel is made to transmit a limited amount of light, optical efficiency decreases.

Japanese Patent Laid-Open Publications No. 119703/1993 and No. 242219/1999, for example, are technical literatures on the prior art. In the surface illuminant units described in these publications, a light-shielding member (a lighting curtain, a light-shielding dot layer) is employed in order to maintain the uniformity of the light intensity (brightness). However, this technique impairs optical efficiency as described above.

Further, a method using a sheet having lenticular lenses on both sides is described in Japanese Patent Laid-Open Publication No. 347613/1994, for example. Such a sheet is for controlling the diffusion of light in two directions, and does not have the function of converging light. Therefore, an optical axis on the surface of an LCD panel changes according to its position relative to cold cathode ray tubes, and the brightness of a display screen varies (non-uniformity of brightness) depending on the position (direction) from which the screen is viewed.

Furthermore, Japanese Patent Laid-Open Publication No. 318003/1988 discloses a film having an array of prisms for converging light. When this film having prisms is used, not only a brightness peak appears at an exit angle of around 0 degree, but also a second brightness peak appears at a great exit angle of about 60 to 80 degrees. The use of such a film has been disadvantageous in that a large amount of light leaks when a screen displays black color, resulting in lowering of contrast. This film having prisms has also been disadvantageous in that it causes abrupt changes in both vertical and horizontal viewing angle characteristics and that the brightness of a display screen changes greatly.

In addition, a conventional surface illuminant unit has light emission characteristics that peak when light exits in the direction of the normal to the plane of emergence of the surface illuminant. Therefore, the use of such a conventional surface illuminant unit for a television or the like, which is usually viewed from above or the front, has been disadvantageous in that optimum viewing angle characteristics cannot be obtained, and that optical efficiency is poor.

SUMMARY OF THE INVENTION

The present invention was accomplished in order to solve the above-described problems in the prior art. An object of the present invention is, therefore, to provide a light-controlling sheet that makes it possible to illuminate a display screen so that the brightness of the screen is uniform regardless of the position (direction) from which the screen is viewed, particularly, a light-controlling sheet that causes no abrupt change in the intensity of light exiting from the light-controlling sheet even at great exit angles, and a surface illuminant unit comprising the light-controlling sheet. Another object of the present invention is to provide a light-controlling sheet that makes it possible to illuminate a display screen so that the brightness of the screen is uniform regardless of the position (direction) from which the screen is viewed, and that has viewing angle characteristics that make a display screen suitable for observation from specified directions, and a surface illuminant unit comprising the light-controlling sheet.

The above objects of the present invention are fulfilled by the following means. In order to facilitate understanding, reference characters are used in the following description of embodiments of the present invention. However, these reference characters should not be construed as limiting the scope of the invention in any way.

The present invention is a light-controlling sheet (14, 24) for making light emitted from light sources uniform and/or converging the light, comprising a lens part having a large number of rod-like unit lenses (141) arranged in parallel, with a lens surface of each unit lens facing to a light-exiting side, a cross section of the lens surface (141D, 141U) of each rod-like unit lens taken perpendicularly to a longitudinal direction of the unit lens being asymmetrical. The light-controlling sheet is used for a surface illuminant unit of direct type, for example.

According to the present invention, since the cross section of the lens surface (141D, 141U) of each rod-like unit lens, taken perpendicularly to the longitudinal direction of the unit lens, is asymmetrical, the light-controlling sheet makes it possible to illuminate a display screen in such a manner that the brightness of the screen is uniform regardless of the position (direction) from which the screen is viewed.

More specifically, the lens surface of the above-described unit lens (141) has a flat surface part (141D) in the shape of a flat surface, and a curved surface part (141U) in the shape of part of a cylindrical surface, for example. In this case, there can be obtained the effect of increasing normal brightness and the effect of making the change in brightness gradual.

Preferably, a ratio of a width of the flat surface part (141D) to a width of the curved surface part (141U), the widths being taken in a direction in which the unit lenses are arranged in parallel and which is perpendicular to the longitudinal direction of the unit lens, is in a range of (1:1) to (1:1.5). In this case, there can be obtained the effect of making the change in brightness gradual without greatly lowering the brightness at an exit angle of around 0 degree, and the effect of suppressing unwanted brightness peaks.

Further, it is preferred that a ratio of a height (H) of the lens surface of the unit lens to a pitch (P) with which the unit lenses are arranged in parallel be in a range of (1:2) to (1:2.5). In this case, there can be obtained more securely the effect of making the change in brightness gradual without greatly lowering the brightness at an exit angle of around 0 degree, and the effect of suppressing unwanted brightness peaks.

Furthermore, preferably, each unit lens (141) is made in such a manner that the curved surface part (141U) of the lens surface faces to an upper side relative to a vertical direction. In this case, as for the viewing angle characteristics of the upper part of the light-controlling sheet, a gradual change in viewing angle can be obtained. On the other hand, the flat surface part (141D) of the lens surface is on the lower side relative to the vertical direction, so that the viewing angle characteristics of the lower part of the light-controlling sheet greatly change. However, since it is rare that a display screen is viewed from below, the brightness at an exit angle of around 0 degree does not greatly lower due to the effect of the flat surface part.

Furthermore, it is preferred that the lens surface of each unit lens (141) has an apex (T) in the shape of a curved surface, smoothly connecting the flat surface part and the curved surface part. By so making the lens surface of each unit lens, it is possible to make the change in brightness more gradual and also prevent another sheet or the like to be placed on the light-controlling sheet from being damaged. In general, a curvature radius of the apex (T) is smaller than a curvature radius of the curved surface part.

Alternatively, the lens surface of each unit lens (241) has an upper surface part (241U) in the shape of part of a cylindrical surface, situated on an upper side relative to a vertical direction, a lower surface part (241D) in the shape of part of a cylindrical surface, situated on a lower side relative to the vertical direction, and an apex (241T) in the shape of a curved surface, smoothly connecting the upper surface part and the lower surface part, the upper surface part, the lower surface part, and the apex being different in curvature radius. In this case, more uniform illumination can be attained.

Preferably, the curvature radius of the apex (241T) is smallest, and that of the lower surface part (241D) is greatest. By so making the radii, it is possible to make the change in the brightness of the upper part of a display screen gradual, this part being viewed usually, while maintaining the normal (front) brightness high. Moreover, in this case, not only the unit lenses do not damage a sheet or the like to be placed on the light-controlling sheet, but also the apexes (241T) are not broken.

Further, it is preferred that the curvature radius of the apex (241T) be 0.02 mm to 0.08 mm. In this case, the unwanted brightness peak at a great exit angle of 50° or more becomes lower. In addition, since the strength of the apexes is secured, the apexes are not broken.

Furthermore, it is preferred that a pitch P with which the unit lenses (241) are arranged in parallel and a width WT of the apex (241T) taken in a direction in which the unit lenses are arranged in parallel and which is perpendicular to the longitudinal direction of the unit lens fulfill following relationships: 0.05 mm<P<0.5 mm, and 0.025<WT/P<0.25. In this case, the unwanted brightness peak at an exit angle of as great as 50° or more becomes lower, and, moreover, a moiré pattern does not occur.

It is preferred that the light-controlling sheet having any of the above-described features be made from a thermoplastic resin. In this case, the light-controlling sheet can show enhanced resistance to environment and/or light.

The present invention is also a surface illuminant unit for illuminating a transmission type display part (11) from its rear, comprising a light source part (12, 13) having an array of light sources, and a light-controlling sheet (14, 24) having any of the above-described features.

Further, the present invention is a light-controlling sheet (414) for making light emitted from light sources uniform and/or converging the light, comprising a lens part having a large number of rod-like unit lenses (441) arranged in parallel, with a lens surface of each unit lens facing to a light-exiting side, a cross section of the lens surface (441D, 441U) of each rod-like unit lens taken perpendicularly to a longitudinal direction of the unit lens being asymmetrical, the lens surface of each unit lens (441) having two or more curved surface parts (441D, 441U) in the shapes of respective parts of two or more different cylindroid (elliptic cylindrical) surfaces. This light-controlling sheet is also used in a surface illuminant unit of direct type, for example.

According to the present invention, since the cross section of the lens surface (441D, 441U) of each rod-like unit lens, taken perpendicularly to the longitudinal direction of the unit lens, is asymmetrical, the outgoing light is deflected so that it illuminates a display screen to make the brightness of the screen uniform regardless of the position (direction) from which the screen is viewed. In particular, since the lens surface of each unit lens (441) has two or more curved surface parts (441D, 441U) in the shapes of respective parts of two or more different cylindroid surfaces, the light-controlling sheet deflects illumination light, and, moreover, it does not present non-uniformity of brightness. The light-controlling sheet having such unit lenses thus makes it possible to illuminate a display screen in such a manner that the brightness of the screen is more uniform regardless of the position (direction) from which the screen is viewed.

Preferably, the lens surface of each unit lens has an upper surface part in the shape of part of a cylindroid surface, situated on an upper side relative to a vertical direction, and a lower surface part in the shape of part of a cylindroid surface, situated on a lower side relative to the vertical direction, the upper surface part and the lower surface part being different in shape. The light-controlling sheet having such unit lenses can control the vertical light emission characteristics.

More preferably, the upper surface part is greater than the lower surface part in a width taken in a direction in which the unit lenses are arranged in parallel and which is perpendicular to the longitudinal direction of the unit lens. In this case, the light-controlling sheet emits (exits) an increased amount of the illumination light toward the front or upward.

Further, the present invention is a surface illuminant unit for illuminating a transmission type display part (411) from its rear, comprising a light source part (412, 413) having an array of light sources, and a light-controlling sheet (414) having any of the above-described features.

In this case, it is preferred that the surface illuminant unit further comprises, on an observer side of the light-controlling sheet, at least one optical sheet of a type identical with or different from a type of the light-controlling sheet.

More preferably, one of the optical sheets placed on the observer side of the light-controlling sheet is a polarized-light-separating sheet.

DETAILED DESCRIPTION OF THE PRESENT INVENTION

Figure 1:
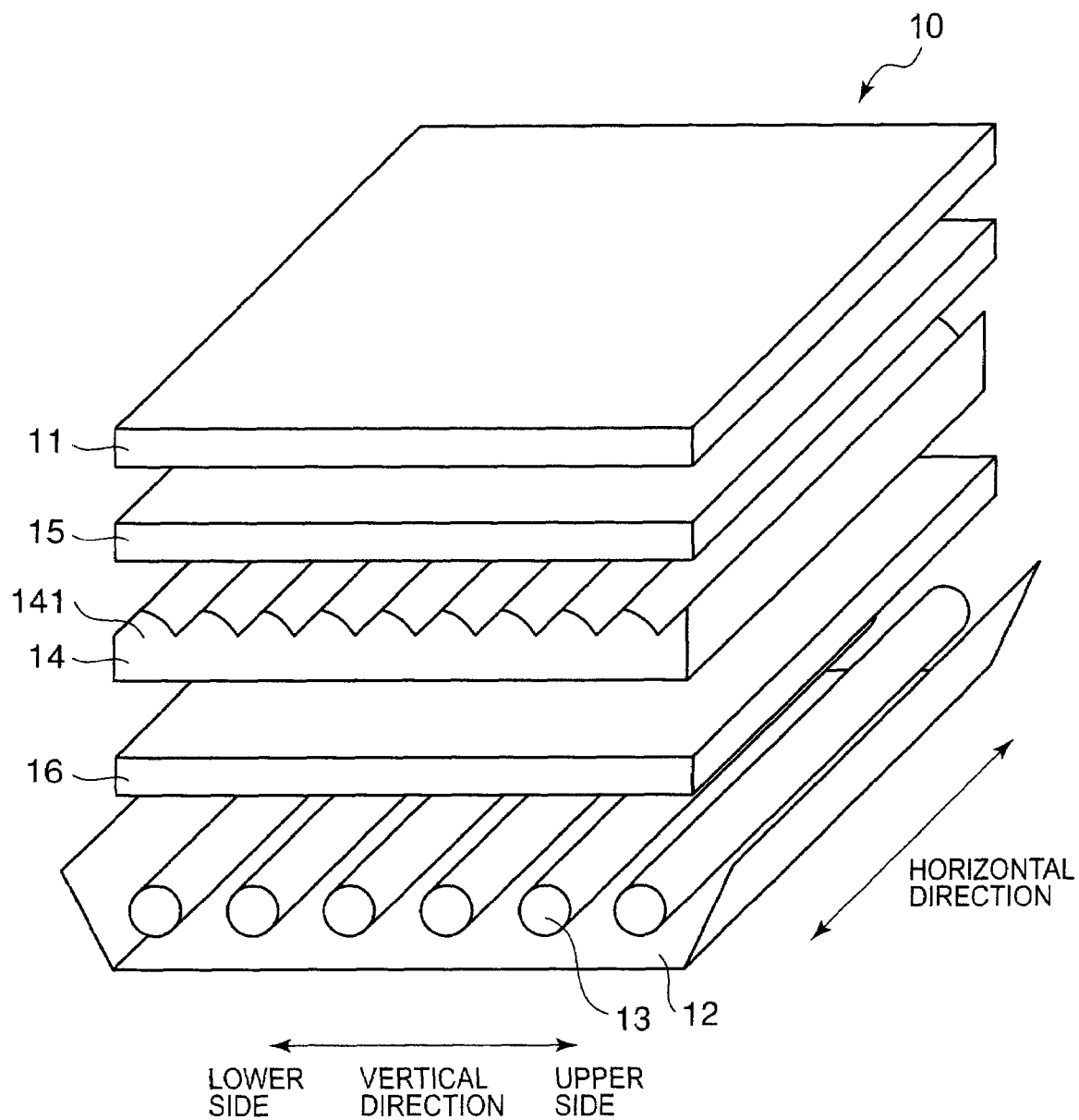
FIG. 1 is an exploded perspective view showing a first embodiment of a transmission type display according to the present invention.

Embodiments of the present invention will be hereinafter described in detail with reference to the accompanying drawings. In the drawings, the dimensions and shapes of respective component parts are exaggerated in order to facilitate understanding.

FIG. 1 is an exploded perspective view showing a first embodiment of a transmission type display according to the present invention. As shown in FIG. 1, a transmission type display 10 comprises an LCD panel 11, a reflector 12, light-emitting tubes 13, a light-controlling sheet 14, a reflective polarizer 15, and a diffuser plate 16.

The transmission type display 10 is a device that displays image information formed in the LCD panel 11 by illuminating it from its rear. The reflector 12, the light-emitting tubes 13, the light-controlling sheet 14, the reflective polarizer 15, and the diffuser plate 16 constitute a surface illuminant unit for illuminating the LCD panel 11 from its rear.

The LCD panel 11 is composed of so-called transmission-type liquid crystal display elements, and it can attain 800×600 dot matrix display when the screen size is 30 inches.

In this embodiment, the longitudinal direction of the light-emitting tubes 13 is referred to as the horizontal direction, and the direction in which the light-emitting tubes 13 are arranged, the vertical direction.

The light-emitting tubes 13 are cold cathode ray tubes, line light sources, and they constitute the light source part of the surface illuminant unit. In this embodiment, six light-emitting tubes 13 are arranged in parallel, with equally spaced about 75 mm apart.

On the rear of the light-emitting tubes 13 is placed the reflector 12. The reflector 12 is placed on the side opposite to the light-controlling sheet 14 (the rear side) so that it covers and supports all of the light-emitting tubes 13. The reflector 12 has the function of diffuse reflecting illumination light emitted from the light-emitting tubes 13 toward the rear side, to make the light travel toward the light-controlling sheet 14 (the direction in which light exits). Owing to this function of the reflector 12, the intensity of light entering the light-controlling sheet 14 becomes nearly uniform.

The reflective polarizer 15 is a polarized-light-separating sheet that increases brightness without narrowing viewing angle, and is placed between the LCD panel 11 and the light-controlling sheet 14. In this embodiment, a DBEF (manufactured by Sumitomo 3M Limited, Japan) is used as the reflective polarizer 15.

The diffuser plate 16 is a diffuser having non-directional light-diffusing properties and is placed on the light source side of the light-controlling sheet 14.

Figure 2:
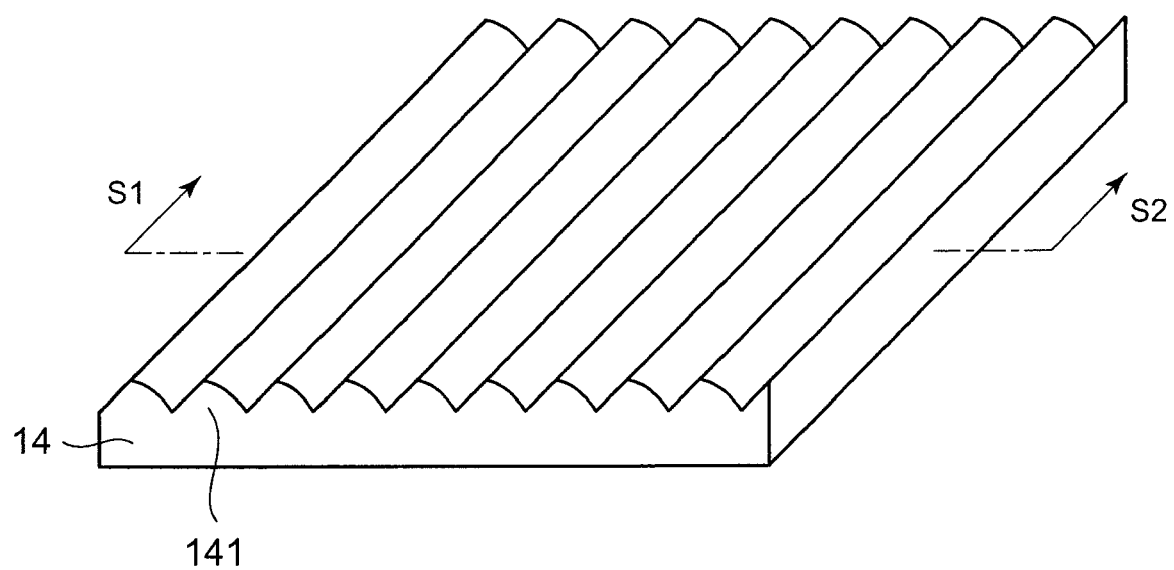
FIG. 2 is a perspective view showing the structure of the light-controlling sheet shown in FIG. 1.

FIG. 2 is a perspective view of the light-controlling sheet 14. As shown in this figure, the light-controlling sheet 14 has, on the light-exiting side, rod-like (rod-shaped) unit lenses 141 for converging light. These unit lenses 141 reduce the non-uniformity of intensity of light emitted from the light-emitting tubes 13 to make the intensity of the light uniform. The lens surface of each unit lens 141 is a combination of a flat surface part and a curved surface part. On the light-exiting-side surface of the light-controlling sheet 14, a large number of such unit lenses 141 are arranged in parallel. In this embodiment, the direction in which the unit lenses 141 are arranged is the same as the direction in which the light-emitting tubes 13 are arranged (see FIG. 1).

The light-controlling sheet 14 of this embodiment is made from transparent PMMA (acrylic resin) with a refractive index of 1.49 by extrusion. Not only PMMA but also a resin selected from other thermoplastic resins having light transmission properties can be used for the light-controlling sheet 14. Alternatively, the light-controlling sheet 14 may be made by a method called UV molding, using an ultraviolet-curing resin.

Figure 3:
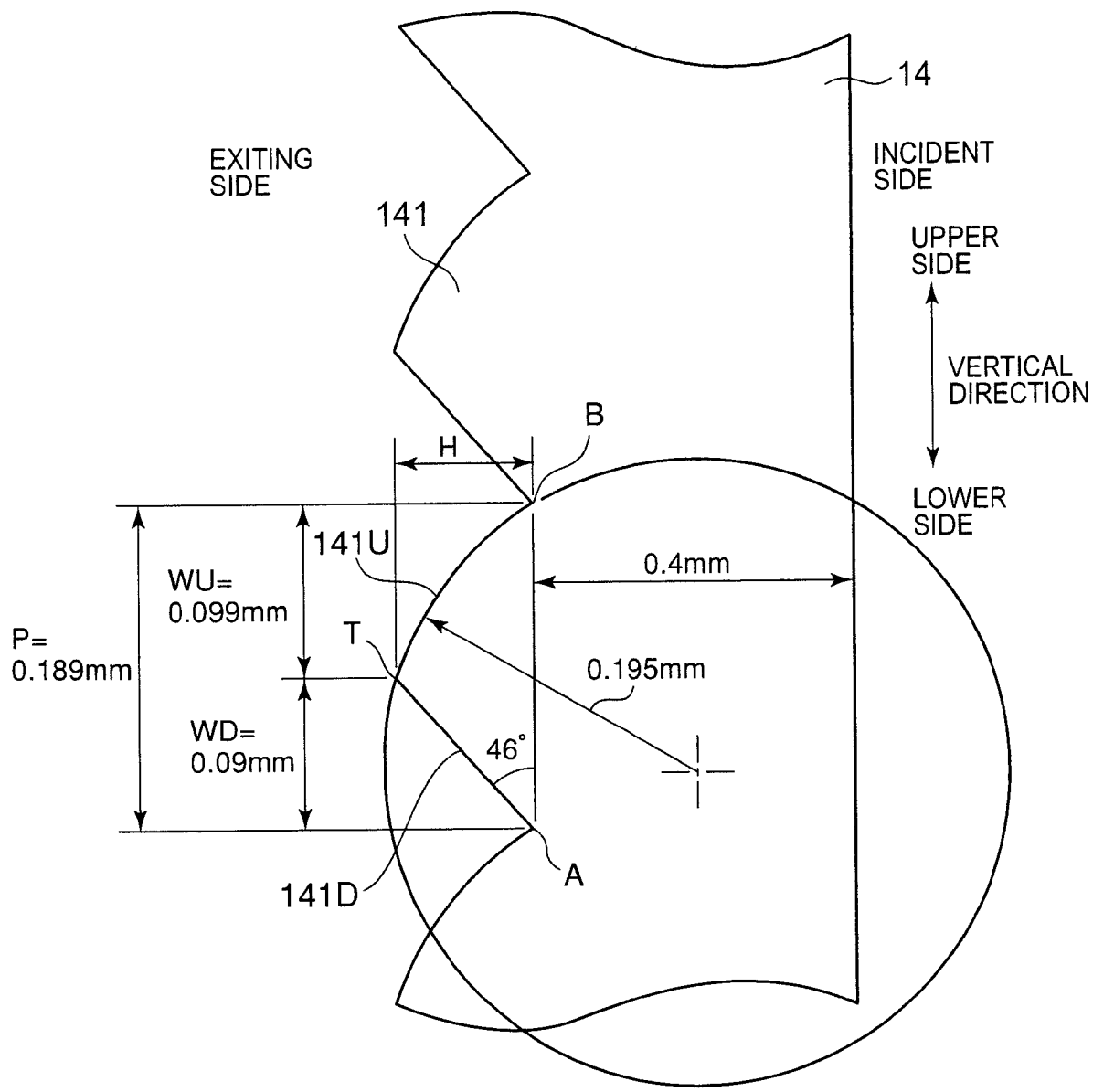
FIG. 3 is a sectional view of the light-controlling sheet shown in FIG. 2, taken along line S1-S2 of FIG. 2.

FIG. 3 is a sectional view of the light-controlling sheet 14 shown in FIG. 2, taken along line S1-S2 of FIG. 2. Shown in this figure is a cross section of the light-controlling sheet 14 that is put in an upright position like at the time it is used. Namely, the vertical direction in the figure is the direction in which the light-controlling sheet 14 is retained while it is used. Further, the left-hand side in the figure is the light-exiting side.

The lens surface of the unit lens 141 has an upper surface part 141U situated on the upper side of an apex T, and a lower surface part 141D situated on the lower side of the apex T.

The lower surface part 141D of the lens surface is a belt-shaped flat surface part 141D whose vertical width, the distance between the deepest point A and the apex T, is 0.09 mm; that is, the vertical width WD of the lower surface part 141D in the cross section shown in FIG. 3 is 0.09 mm. In this embodiment, the angle that the flat surface part 141D forms with the vertical direction is 46 degrees.

A plane in which the light-controlling sheet 14 stretches is herein referred to as a sheet plane. In this embodiment, the sheet plane is parallel with the light-entering-side surface of the light-controlling sheet 14. In the following description, the exit angle means the angle that outgoing light forms with the normal to the sheet plane.

In the cross section shown in FIG. 3, the upper surface part 141U is a cylindrical surface part (part of a cylindrical surface) between the deepest point B at 0.189 mm right above the deepest point A and the apex T, where the radius of the cylindrical shape is 0.195 mm. In this case, the vertical width WU of the upper surface part 141U is 0.099 mm. Therefore, the ratio of the width WD of the flat surface part of the unit lens 141 to the width WU of the curved surface part of the unit lens 141 is 1:1.1, the widths being taken in the vertical direction in parallel with the sheet plane.

Experiments were carried out in order to confirm the effect of the unit lenses in the light-controlling sheet 14 of this embodiment, each unit lens having the upper surface part 141U in the shape of a cylindrical surface and the lower surface part 141D in the shape of a flat surface. Specifically, a surface illuminant unit containing the light-controlling sheet 14 was assembled, and the brightness distribution was determined. Further, a comparative light-controlling sheet with prisms was prepared, and similarly, a surface illuminant unit containing the comparative light-controlling sheet was assembled, and the brightness distribution was determined. The brightness distributions were obtained by the use of the surface illuminant units from which the LCD panel 11 and the reflective polarizer 15 had been removed.

Figure 4:
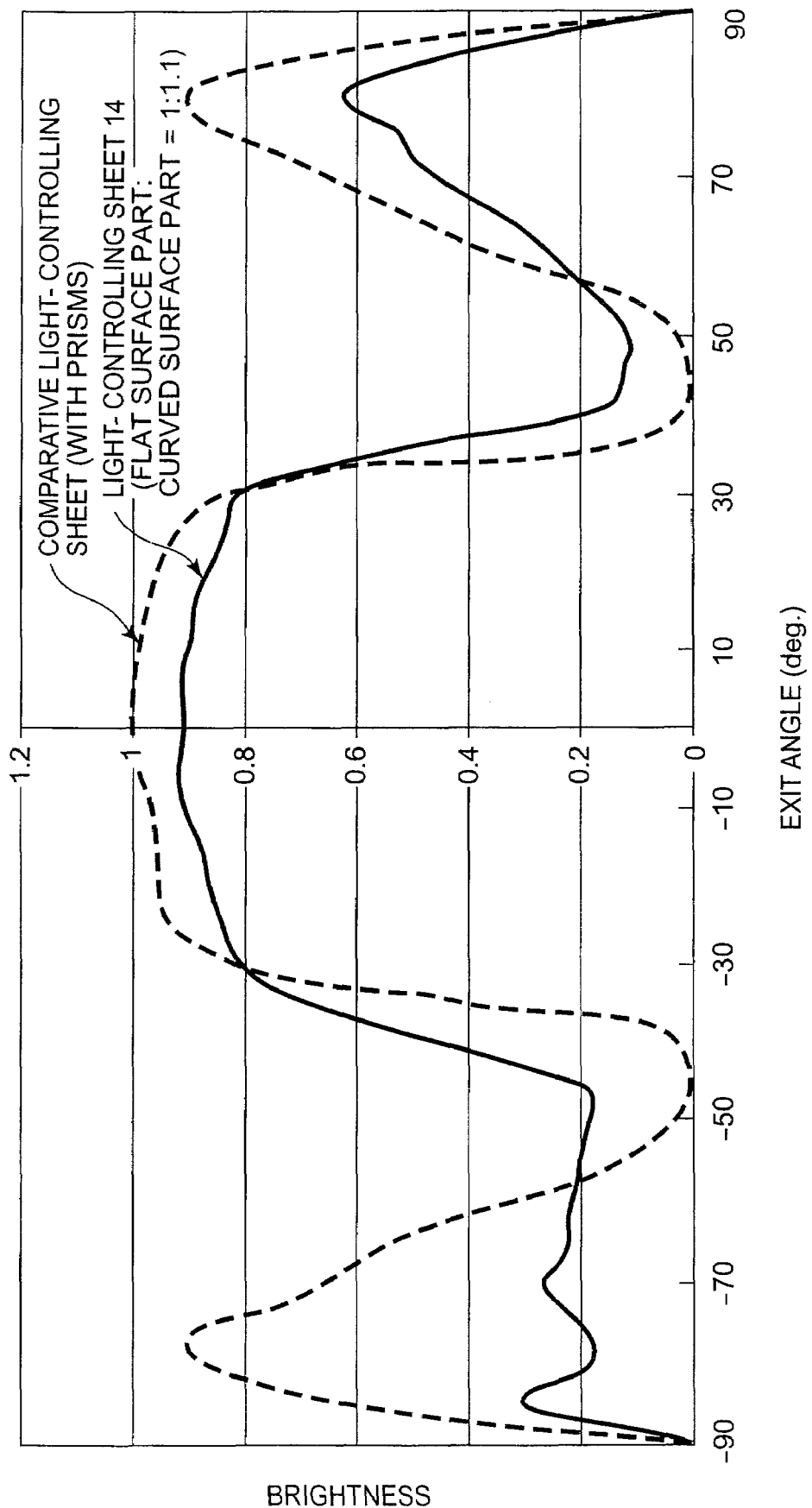
FIG. 4 is a graph showing the vertical distribution of brightness of the light-controlling sheet shown in FIG. 2, in a comparison of that of a comparative light-controlling sheet.

FIG. 4 is a graph showing the vertical distribution of brightness of the light-controlling sheet 14 of this embodiment, in a comparison of that of the comparative light-controlling sheet having prisms. In this figure, the brightness is shown relative to the maximum brightness value (brightness 1) of the comparative light-controlling sheet. The minus side of the exit angle corresponds to the upper part of the light-controlling sheet at the time it is used, and the plus side of the exit angle, the lower part of the light-controlling sheet at the time it is used.

In the distribution of brightness of the comparative light-controlling sheet shown in FIG. 4, there exist a peak at an exit angle of around 0 degree, which sharply drops at an exit angle of around 40 degrees, as well as a second peak at a great exit angle between about 60 degrees and about 80 degrees. From the actual observation of the comparative light-controlling sheet, it was found that, at the time of black color display, light leaks in a great amount, impairing contrast. On the other hand, in the distribution of brightness of the light-controlling sheet 14 of this embodiment, although the brightness at an exit angle of around 0 degree is slightly lower than that of the comparative light-controlling sheet, the brightness drop at an exit angle of about 40 degrees is less sharp than the one that occurs when the comparative light-controlling sheet is used. Moreover, the unwanted peak that appears on the minus side of the exit angle (the upper part of the light-controlling sheet) when the comparative light-controlling sheet is used does not appear when the light-controlling sheet 14 of this embodiment is used, and another unwanted peak on the plus side of the exit angle (the lower part of the light-controlling sheet) that appears when the comparative light-controlling sheet is used becomes lower when the light-controlling sheet 14 of this embodiment is used.

Figure 5:
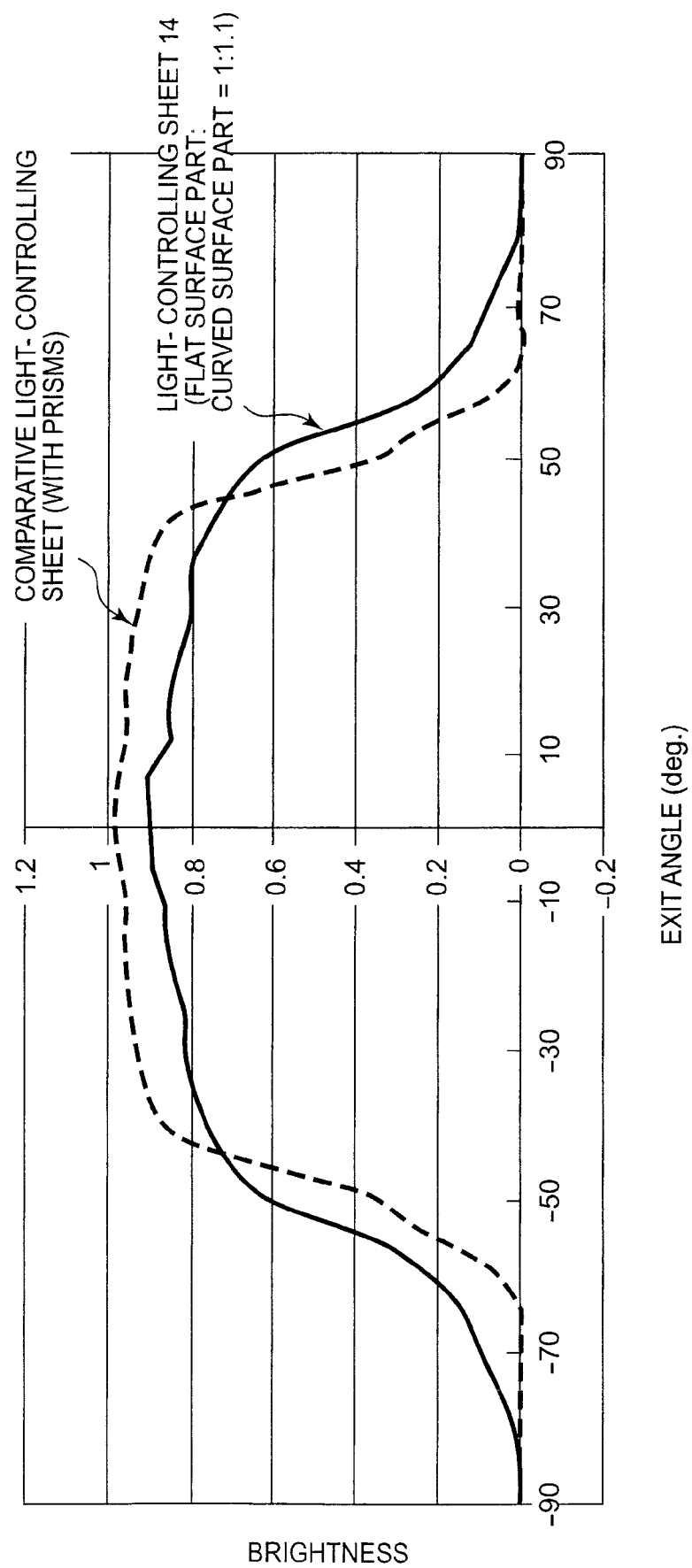
FIG. 5 is a graph showing the horizontal distribution of brightness of the light-controlling sheet shown in FIG. 2, in a comparison of that of a comparative light-controlling sheet.

Next, FIG. 5 is a graph showing the horizontal distribution of brightness of the light-controlling sheet 14, in a comparison of that of the comparative light-controlling sheet.

As shown in FIG. 5, no unwanted peaks exist in both the horizontal distribution of brightness of the light-controlling sheet 14 and that of the comparative light-controlling sheet. Although the brightness of the comparative light-controlling sheet sharply drops at an exit angle of about 60 degrees, the brightness of the light-controlling sheet 14 changes gradually.

Thus, the horizontal and vertical viewing angle characteristics of the light-controlling sheet 14 of this embodiment change gradually. Further, the light-controlling sheet 14 can eliminate or suppress the unwanted brightness peaks that appear in the vertical brightness distribution when the comparative light-controlling sheet is used.

The above-described abrupt change in the brightness of the comparative light-controlling sheet is inevitable because the comparative light-controlling sheet has prisms with flat faces. It was found that unit lenses with curved lens surfaces are effective in suppressing this abrupt change to make the change in brightness gradual and eliminating the unwanted peaks. However, it was also found that flat lens surfaces are effective in obtaining high brightness at an exit angle of about 0 degree.

Since the human eyes are in the horizontal direction, the display of this embodiment should have horizontally symmetrical viewing angle characteristics. It is, however, not necessary that the viewing angle characteristics be vertically symmetrical. Since it is rare that the display is viewed from below, it is desirable to improve the vertical viewing angle characteristics in the following manner: in order to obtain increased normal brightness (at an exit angle of 0 degree), the viewing angle of the lower part of the display is drastically narrowed, while the change in the viewing angle of the upper part of the display is made gradual. Further, it is necessary to suppress unwanted peaks. Furthermore, as for the horizontal viewing angle characteristics, it is desirable that the viewing angle be as large as possible, and that the change in viewing angle be gradual.

Therefore, this embodiment employs the asymmetrical lens surface whose upper surface part 141U is in the form of a cylindrical surface and whose lower surface part 141D is in the form of a flat surface. The unit lenses 141 with such lens surfaces can make the change in the brightness of the upper part, relative to the vertical direction, of the light-controlling sheet gradual without greatly lowering the brightness at an exit angle of around 0 degree, and can also make the upper part of the light-controlling sheet show no unwanted brightness peak.

In the meantime, it is possible to change the viewing angle characteristics of the light-controlling sheet 14 of this embodiment by varying the proportion of the cylindrical surface part, the upper surface part 141U, to the flat surface part, the lower surface part 141D, in the lens surface.

For example, a light-controlling sheet 14-2 (of a second embodiment) with unit lenses having a modified proportion of the cylindrical surface part, the upper surface part 141U, to the flat surface part, the lower surface part 141D, in the lens surface of each unit lens can be obtained by changing the vertical width WU of the upper part 141U to 0.09 mm, and changing the ratio of the width of the flat surface part to that of the cylindrical surface part to WD:WU=1:1.

Figure 6:
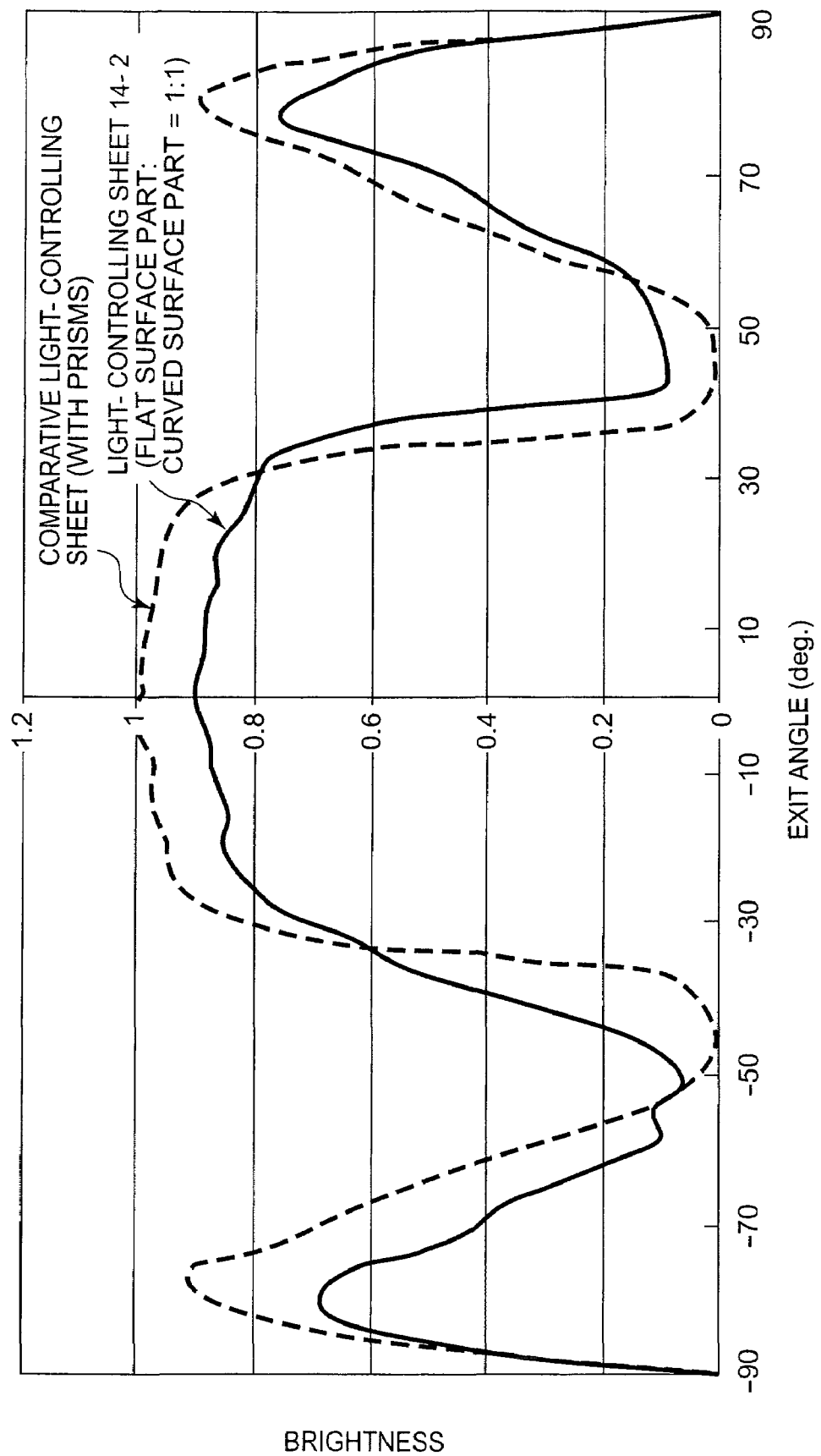
FIG. 6 is a graph showing the vertical distribution of brightness of a light-controlling sheet of a second embodiment, in a comparison of that of a comparative light-controlling sheet.

FIG. 6 is a graph showing the vertical distribution of brightness of the light-controlling sheet 14-2, in a comparison of that of the comparative light-controlling sheet.

The change in the brightness of the light-controlling sheet 14-2 is more gradual than that of the comparative light-controlling sheet, although it is less gradual as compared with the change in the brightness of the above-described light-controlling sheet 14.

By increasing the proportion of the cylindrical surface part, the upper surface part 141U, it is possible to make the change in brightness more gradual. However, if this proportion is made excessively high, the normal brightness decreases.

Light-controlling sheets having different ratios of the width of the flat surface part to that of the cylindrical surface part (WD:WU) were prepared and evaluated. As a result, it was found that the ratio of the width of the flat surface part to that of the cylindrical surface part (WD:WU), desirable for making the change in brightness gradual without greatly lowering the brightness at an exit angle of around 0 degree and for suppressing the unwanted brightness peak, is from (1:1) to (1:1.5).

Light-controlling sheets with different parameters were also prepared and evaluated in terms of the ratio (H:P) of the height H of the unit lens (the height from the deepest points A, B) to the pitch P with which the unit lenses are arranged. As a result, it was found that the ratio H:P, desirable for making the change in brightness gradual without greatly lowering the brightness at an exit angle of around 0 degree and for suppressing the unwanted brightness peak, is from (1:2) to (1:2.5).

In the light-controlling sheet 14 of the above-described first embodiment, the height H of the unit lens 141 is 0.093 mm, and the pitch P with which the unit lenses 141 are arranged is 0.198 mm. Therefore, the ratio of the height of the unit lens to the pitch with which the unit lenses are arranged, H:P, is 1:2.13, and this ratio falls in the above-described range.

Figure 9:
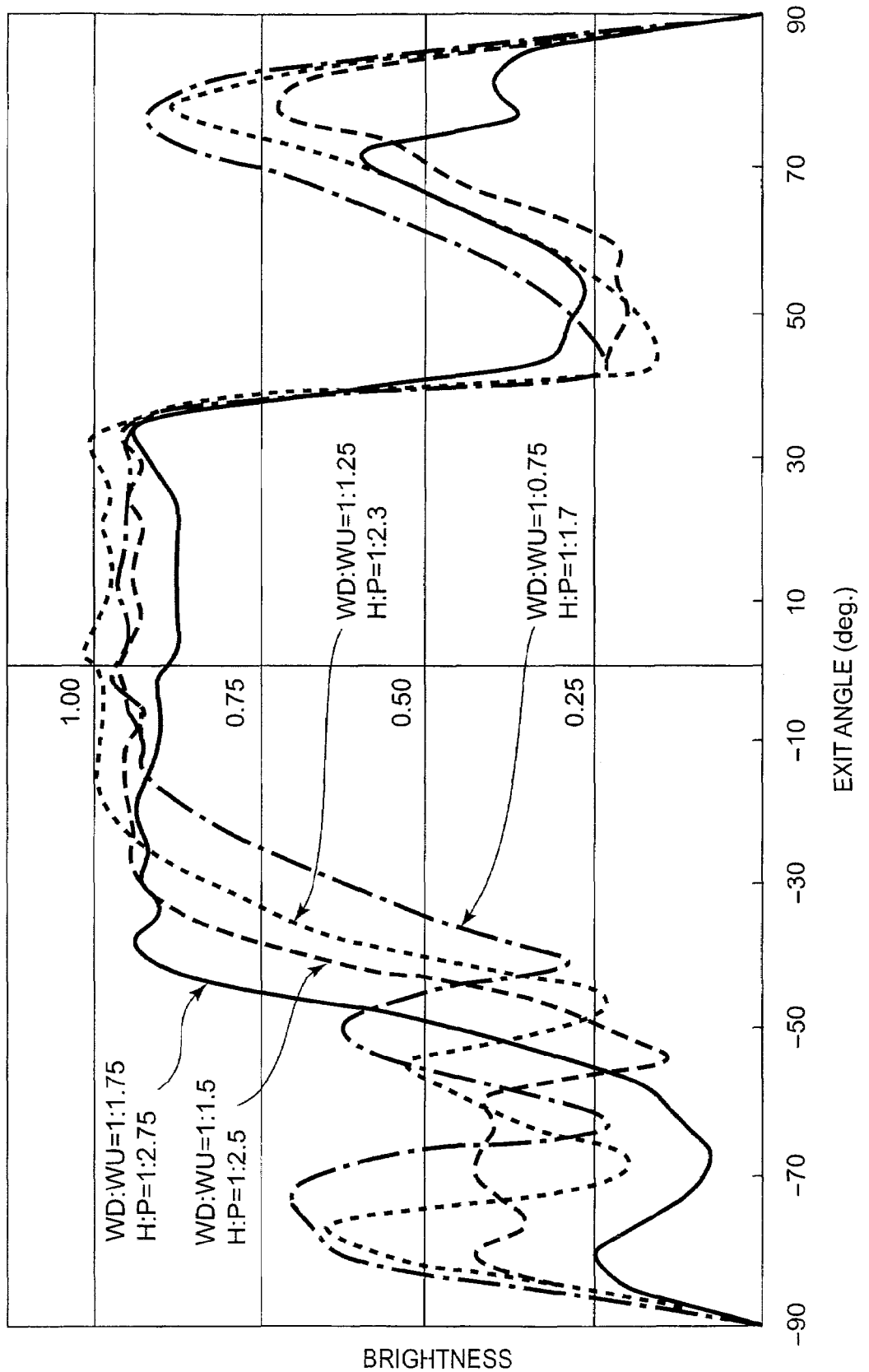
FIG. 9 is a graph showing the vertical distributions of brightness of light-controlling sheets different in the ratio of the width of the flat surface part to that of the curved surface part, WD:WU, and in the ratio of the height of the lens surface of the unit lens to the pitch with which the unit lenses are arranged in parallel, H:R

FIG. 9 is a graph showing the vertical distributions of brightness of light-controlling sheets prepared by varying the ratio WD:WU of the width of the flat surface part to that of the cylindrical surface part and the ratio H:P of the height of the lens surface of the unit lens to the pitch with which the unit lenses are arranged. In FIG. 9, brightness is shown relative to the maximum brightness value (brightness 1) of the comparative light-controlling sheet. Further, the minus side of the exit angle corresponds to the upper part of the light-controlling sheet at the time it is used, and the plus side of the exit angle, the lower part of the light-controlling sheet at the time it is used.

A light-controlling sheet having a ratio WD:WU of 1:1.75, which is above the upper limit 1:1.5, and a ratio H:P of 1:2.75, which is above the upper limit 1:2.5, can exit light at greater exit angles, but makes the normal brightness (at an exit angle of 0 degree) excessively low.

Further, a light-controlling sheet having a ratio WD:WU of 1:0.75, which is below the lower limit 1:1, and a ratio H:P of 1:1.7, which is below the lower limit 1:2, exits light at excessively small exit angles. Such a light-controlling sheet cannot be put into practical use.

Thus, it is desirable that the ratio WD:WU be in the range of (1:1) to (1:1.5), and that the ratio H:P be in the range of (1:2) to (1:2.5).

As described above, according to this embodiment, since the light-controlling sheet employs rod-like (rod-shaped) unit lenses arranged in parallel, each unit lens having an asymmetrical lens surface that is a combination of a flat surface part and a curved surface part, the sheet can make it possible to illuminate a display screen so that the brightness of the screen is uniform regardless of the position (direction) from which the screen is viewed. In particular, the light-controlling sheet having such unit lenses can suppress unwanted brightness peaks that may appear at great exit angles, and can make the change in brightness gradual.

Next, a third embodiment of a light-controlling sheet according to the present invention will be described. A light-controlling sheet of this embodiment is the same as that of the first embodiment, except for the shape of the unit lens. Like reference characters designate like or corresponding parts in the first and third embodiments, and explanation of such parts already given in the above description will not be repeated in the following description.

Figure 7:
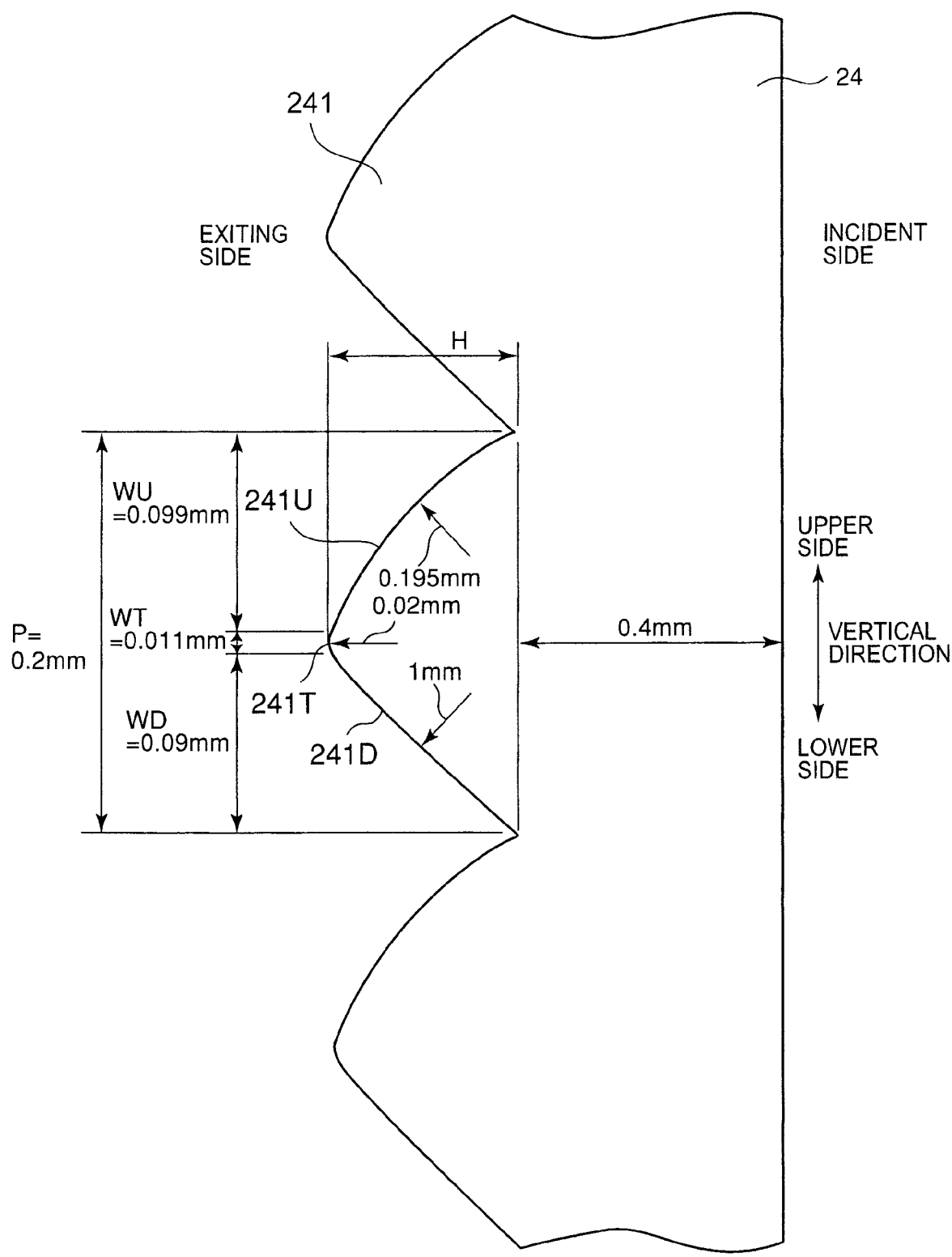
FIG. 7 is a sectional view of a light-controlling sheet of a third embodiment, taken in the same manner as that in which the sectional view shown in FIG. 3 is taken.

FIG. 7 is a sectional view of a light-controlling sheet 24 of this embodiment, taken in the same manner as that in which the sectional view shown in FIG. 3 is taken. Shown in this figure is a cross section of the light-controlling sheet 24 that is put in an upright position like at the time it is used. Namely, the vertical direction in the figure is the direction in which the light-controlling sheet is vertically retained while it is used. Further, the left-hand side in the figure is the light-exiting side.

The light-controlling sheet 24 of this embodiment has, on the light-exiting side, rod-like (rod-shaped) unit lenses 241 for converging light, useful in reducing non-uniformity of intensity of light emitted from light-emitting tubes 13 to make the intensity of the light uniform. The lens surface of each unit lens 241 is in the shape of a combination of three different curved surface parts. A large number of such unit lenses 241 are arranged in parallel on the light-exiting-side surface of the light-controlling sheet 24. In this embodiment, the direction in which the unit lenses are arranged agrees with the direction in which the light-emitting tubes 13 are arranged.

The lens surface of the unit lens 241 is composed of an apex 241T, an upper surface part 241U situated on the upper side of the apex 241T, and a lower surface part 241D situated on the lower side of the apex 241T.

The apex 241T is in the shape of (part of) a cylindrical surface and forms the apex portion of the unit lens 241. The curvature radius of the apex 241T is 0.02 mm, and the width WT of the apex 241T taken in the vertical direction in which the light-controlling sheet is retained while it is used is 0.011 mm.

The upper surface part 241U is in the shape of (part of) a cylindrical surface and is situated on the upper side of the apex 241T relative to the vertical direction in which the light-controlling sheet is retained while it is used. The curvature radius of this part is 0.195 mm, and the width WU of this part taken in the vertical direction in which the light-controlling sheet is retained while it is used is 0.099 mm.

The lower surface part 241D is in the shape of (part of) a cylindrical surface and is situated on the lower side of the apex 241T relative to the vertical direction in which the light-controlling sheet is retained while it is used. The curvature radius of this part is 1 mm, and the width WU of this part taken in the vertical direction in which the light-controlling sheet is retained while it is used is 0.09 mm.

The unit lenses 241 are arranged with a pitch P of 0.2 mm.

The following is the reason why the unit lens 241 is made so that its lens surface is a combination of three different curved surfaces, the apex 241T, the upper surface part 241U, and the lower surface part 241D, as described above.

When the curvature radius of the upper surface part 241U or that of the lower surface part 241D is great, an abrupt change occurs in brightness, although high normal brightness can be obtained. Since it is rare that a display screen is viewed from below, it is possible to obtain increased normal brightness, without making the change in brightness noticeable, by making the curvature radius of the lower surface part 241D great (including infinitely great (flat surface)). On the other hand, in order to make the change in brightness gradual, the curvature radius of the upper surface part 241U is made smaller than that of the lower surface part 241D.

For obtaining increased normal brightness, it is desirable that the apexes 241T be sharp. However, if the apexes 241T are excessively sharp, they themselves may be broken, or they may damage another sheet or member to be placed on the light-exiting side of the light-controlling sheet 241, such as a reflective polarizer 15. In order to avoid these troubles while maintaining the normal brightness, it is desirable to make the curvature radius of the apex 241T small.

Experiments were carried out in order to confirm the effect of the lens surface in the shape of a combination of three different curved surfaces, the apex 241T, the upper surface part 241U, and the lower surface part 241D, that the light-controlling sheet 24 of this embodiment employs.

Figure 8:
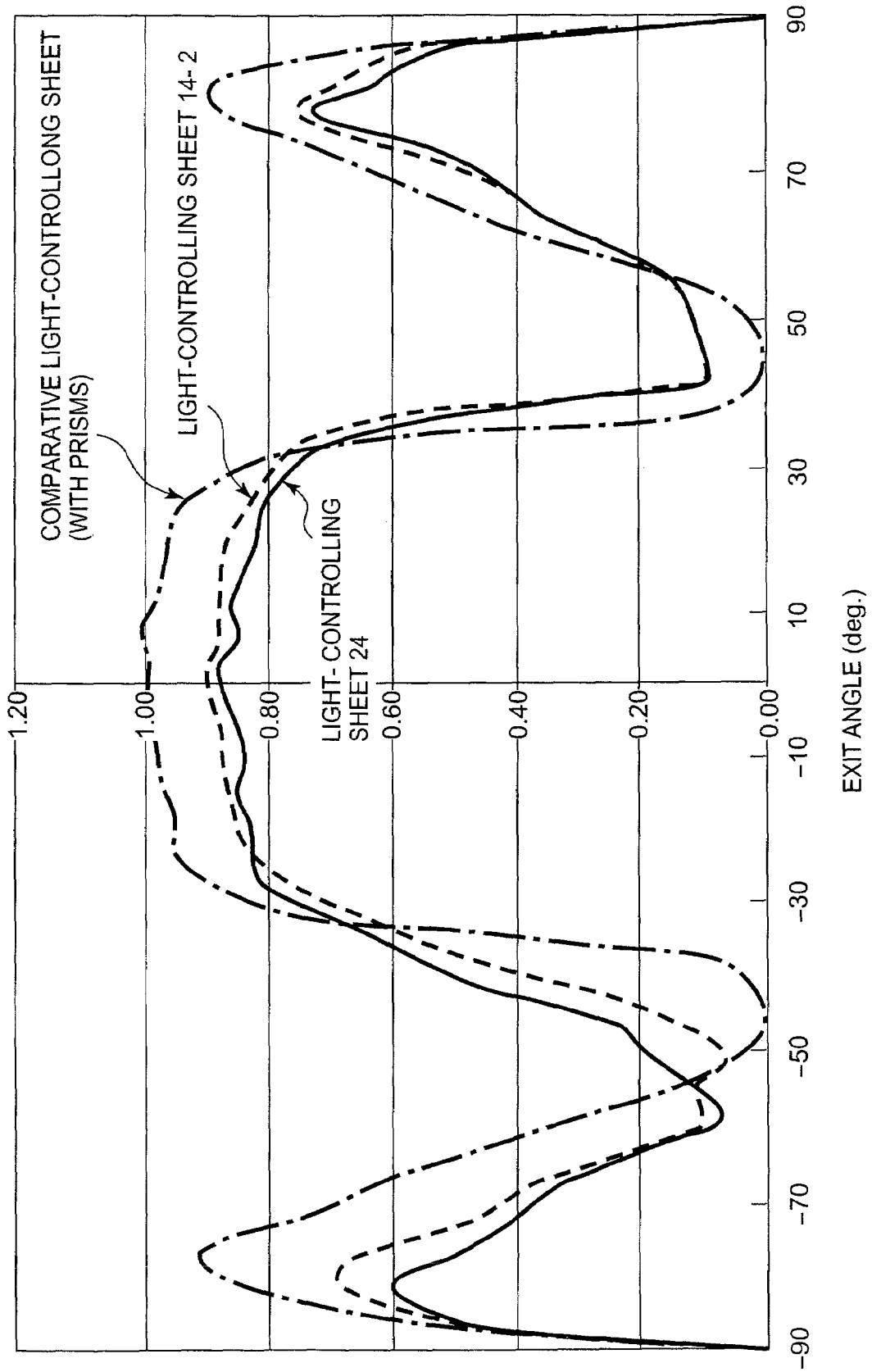
FIG. 8 is a graph showing the vertical distribution of brightness of the light-controlling sheet shown in FIG. 7, in a comparison of those of a comparative light-controlling sheet and the light-controlling sheet of the second embodiment.

FIG. 8 is a graph showing the vertical distribution of brightness of the light-controlling sheet 24 of this embodiment, in a comparison of that of the comparative light-controlling sheet and that of the light-controlling sheet 14-2 of the second embodiment. Specifically, a surface illuminant unit having the light-controlling sheet 24 was used to determine the brightness distribution. The determination of the brightness distribution was made by the use of the surface illuminant unit from which the LCD panel 11 and the reflective polarizer 15 had been removed.

In FIG. 8, brightness is shown, as in FIGS. 4 and 6, relative to the maximum brightness value (brightness 1) of the comparative light-controlling sheet. Further, the minus side of the exit angle corresponds to the upper part of the light-controlling sheet at the time it is used, and the plus side of the exit angle, the lower part of the light-controlling sheet at the time it is used.

As shown in FIG. 8, the unwanted peak of the brightness of the lower part (the plus side of the exit angle) of the light-controlling sheet 24 of this embodiment that appears at an exit angle between about 70° and about 90° is lower than the unwanted peak of the brightness of the lower part of the light-controlling sheet 14-2 that appears at the exit angle. The main cause of this is that the lower surface part 241D of the lens surface of each unit lens of the light-controlling sheet 24 is curved.

Further, the unwanted peak of the brightness of the upper part (the minus side of the exit angle) of the light-controlling sheet 24 of this embodiment that appears an exit angle between about −70° and about −90° is lower than the unwanted peak of the brightness of the upper part of the light-controlling sheet 14-2 that appears at the exit angle. In addition, when the light-controlling sheet 24 is used, the brightness at exit angles of about −30° to −50° is higher and the change in brightness in this exit angle range is more gradual than obtained when the light-controlling sheet 14-2 is used. The main cause of this is that the apex 241T of each unit lens of the light-controlling sheet 24 is curved.

It is desirable that the unit lens 241 be in a shape fulfilling the following requirements.

(Requirement 1)

It is desirable that the curvature radius of the apex 241T be 0.02 to 0.08 mm. By so making the curvature radius, it is possible to lower the unwanted brightness peak at an exit angle of as great as 50° or more. Further, the unit lenses with such apexes 241T never damage the reflective polarizer 15 to be placed on the light-controlling sheet. Moreover, in this case, the strength of the apexes 241T is secured, so that the apexes 241T themselves are not broken.

(Requirement 2)

It is desirable that the pitch P with which the unit lenses 241 are arranged and the width WT of the apex 241T fulfill the following relationships:

$$0.05 \text{ mm} < P < 0.5 \text{ mm} \quad (1), \text{ and}$$

$$0.0025 < WT/P < 0.25 \quad (2).$$

By making the pitch P and the width WT fulfill the above relationships (1) and (2) (fulfill the requirement 2), it is possible to lower the unwanted brightness peak at an exit angle of as great as 50° or more.

When the pitch P with which the unit lenses 241 are arranged is excessively great, the effect of the curved apex 241T cannot be fully obtained, and, in addition, a moiré pattern tends to occur. It is therefore particularly desirable that the pitch P fulfills the relationship (1).

The following tests (experiments) were carried out in order to confirm how the shape of the unit lens 241 affects the normal brightness, the damage to another sheet to be placed on the light-controlling sheet, and the breakage of the apexes 241T.

Samples were made with the unit lens pitch P fixed to 0.2 mm and the width WT of the apex varied. The rate of lowering of normal brightness was determined relative to the normal brightness of the light-controlling sheet having unit lenses with apexes with a width WT of 0, that is, non-curved, sharp apexes.

Further, a diffuser plate 16, each of the above-described light-controlling sheet samples, and a reflective polarizer 15 were placed on a reflector 12 and light-emitting tubes 13, and this assembly was subjected to a vibration test in order to evaluate as to the breakage of the light-controlling sheet and the damage of the reflective polarizer 15.

The results of the vibration tests are shown in Table 1 below.

TABLE 1

| WT/P  | Rate of Lowering of Brightness | Damage & Breakage |
|-------|-------------------------------|-------------------|
| 0.000 | (base)                        | X                 |
| 0.020 | 0.7% down                     | X                 |
| 0.025 | 1% down                       | Δ                 |
| 0.050 | 2% down                       | ○                 |
| 0.250 | 10% down                      | ○                 |
| 0.500 | 20% down                      | ○                 |

As shown in Table 1, when the rate of lowering of brightness exceeds 10%, the normal brightness excessively decreases, and the effect of converging light becomes small. As is clear from the data shown in Table 1, it is desirable that the WT/P value be greater than 0.0025 and smaller than 0.25.

The unit lens 241 of the third embodiment has the apex 241T with a curvature radius of 0.02 mm, so that it fulfills the requirement 1. The lens pitch P is 0.2 mm, and the width WT of the apex 241T is 0.011 mm, so that WT/P=0.011/0.2=0.055. Thus, the unit lens 241 fulfills the requirement 2 as well.

Namely, according to this embodiment, it is possible to more greatly suppress the unwanted brightness peaks that appear at large exit angles, and also make the change in brightness in the required exit angle range gradual.

Further, since the apex of each unit lens is in the shape of a curved surface, the light-controlling sheet has improved resistance to abrasion.

Furthermore, it is possible to make the light-controlling sheet 24 of this embodiment by extruding a resin. A light-controlling sheet 24 made from a resin has improved resistance to environment. In addition, if a thermoplastic resin is used, the light-controlling sheet can also have improved resistance to light.

The present invention is not limited to the above-described embodiments (the first to third embodiments) and is susceptible to modifications without departing from the scope of the appended claims. All changes that come within the meaning and range of equivalency of the claims are therefore embraced in the scope of the invention.

(1) In the above-described embodiments, the light-controlling sheet 14, 24 has, on the light-exiting side, an array of unit lenses 141, 241 of one type. The present invention is not limited to this, and unit lenses of two or more types may also be arranged in combination on the light-exiting side, for example.

(2) In the first embodiment, the apex T of the unit lens 141 is sharp and simply connects the upper surface part 141U and the lower surface part 141D. The present invention is not limited to this. The upper surface part 141U and the lower surface part 141D, which are asymmetrical relative to the apex T, may also be smoothly connected together by a curved surface, for example. In this case, the change in brightness becomes more gradual. Moreover, the unit lenses with these curved apexes do not damage another sheet to be placed on the light-controlling sheet 14, such as a reflective polarizer 15.

(3) In the above-described embodiments, the light source part uses an array of line light sources. The present invention is not limited to this. For example, the light source part having an array of point light sources is also useful in the present invention.

(4) In the above-described embodiments, the upper surface part 141U, the apex 241T, the upper surface part 241U, and the lower surface part 241D are part of cylindrical surfaces. The present invention is not limited to this. Each one of these parts may also be either part of an cylindroid (elliptic cylindrical) surface or a curved surface composed of two or more curved surfaces in combination.

Figure 10:
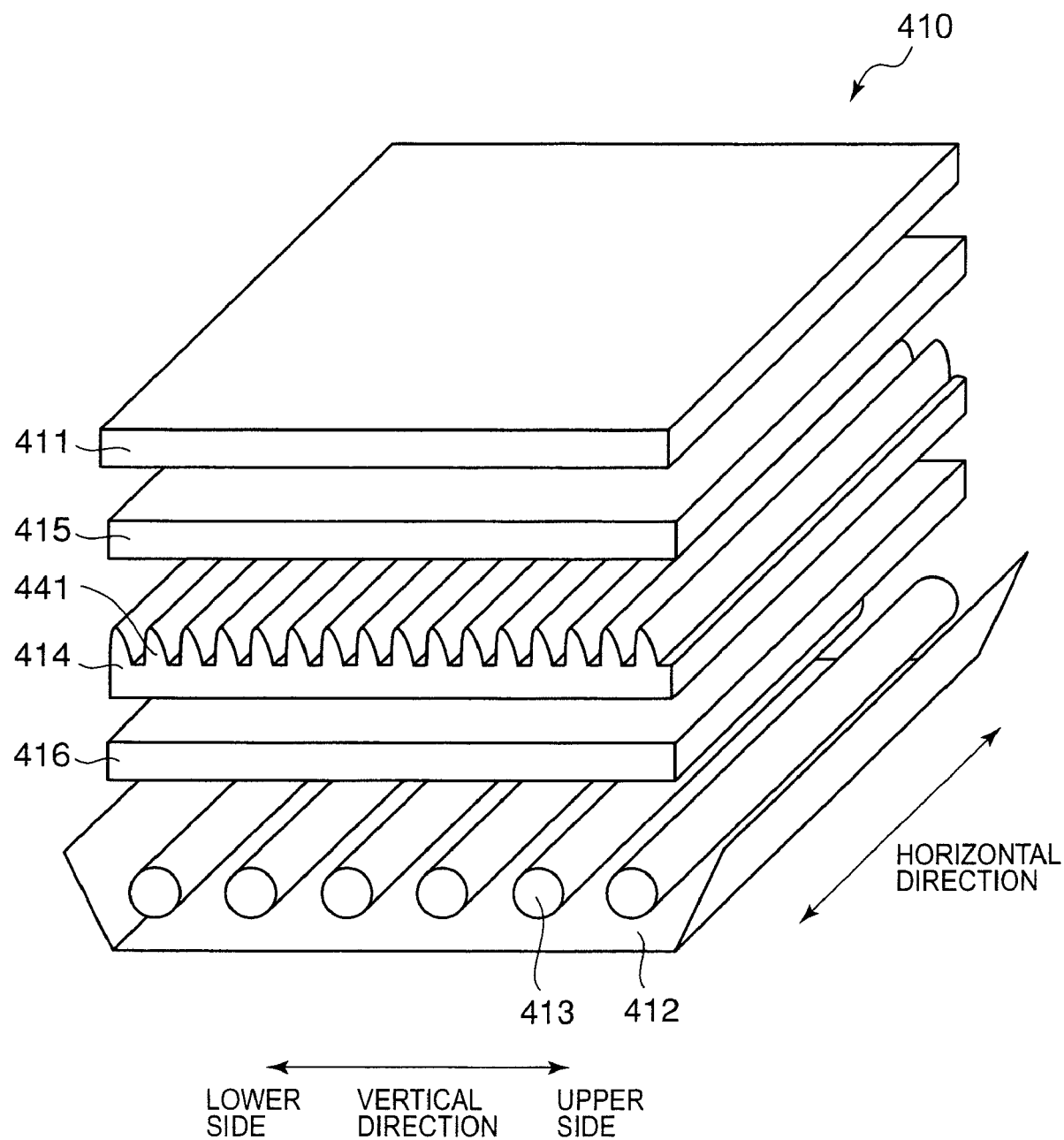
FIG. 10 is an exploded perspective view showing another embodiment (fourth embodiment) of a transmission type display according to the present invention.

Next, FIG. 10 is an exploded perspective view showing another embodiment (fourth embodiment) of a transmission type display according to the present invention. As shown in FIG. 10, a transmission type display 410 comprises an LCD panel 411, a reflector 412, light-emitting tubes 413, a light-controlling sheet 414, a reflective polarizer 415, and a diffuser plate 416.

The transmission type display 410 is a device that displays image information formed in the LCD panel 411 by illuminating it from its rear. The reflector 412, the light-emitting tubes 413, the light-controlling sheet 414, the reflective polarizer 415, and the diffuser plate 416 constitute a surface illuminant unit for illuminating the LCD panel 411 from its rear.

The LCD panel 411 is also composed of so-called transmission-type liquid crystal display elements, and it can attain 800×600 dot matrix display when the screen size is 30 inches.

In this embodiment, the longitudinal direction of the light-emitting tubes 413 is referred to as the horizontal direction, and the direction in which the light-emitting tubes 413 are arranged is referred to as the vertical direction.

The light-emitting tubes 413 are cold cathode ray tubes, line light sources, and constitute the light source part of the surface illuminant unit (the light source part of a backlight unit). In this embodiment, six light-emitting tubes 413 are arranged in parallel, with equally spaced about 75 mm apart.

On the rear of the light-emitting tubes 413 is placed the reflector 412. The reflector 412 is placed on the side opposite to the light-controlling sheet 414 (the rear side) so that it covers and supports all of the light-emitting tubes 413. The reflector 412 has the function of diffuse reflecting illumination light emitted from the light-emitting tubes 413 toward the rear side, to make the light travel toward the light-controlling sheet 414 (the direction in which light exits). Owing to this function of the reflector 412, the intensity of light entering the light-controlling sheet becomes nearly uniform.

The reflective polarizer 415 is a polarized-light-separating sheet that increases brightness without narrowing viewing angle, and is placed between the LCD panel 411 and the light-controlling sheet 414. In this embodiment, a DBEF (manufactured by Sumitomo 3M Limited, Japan) is used as the reflective polarizer 415.

The diffuser plate 416 is a diffuser having non-directional light-diffusing properties and is placed on the light source side of the light-controlling sheet 414.

Figure 11:
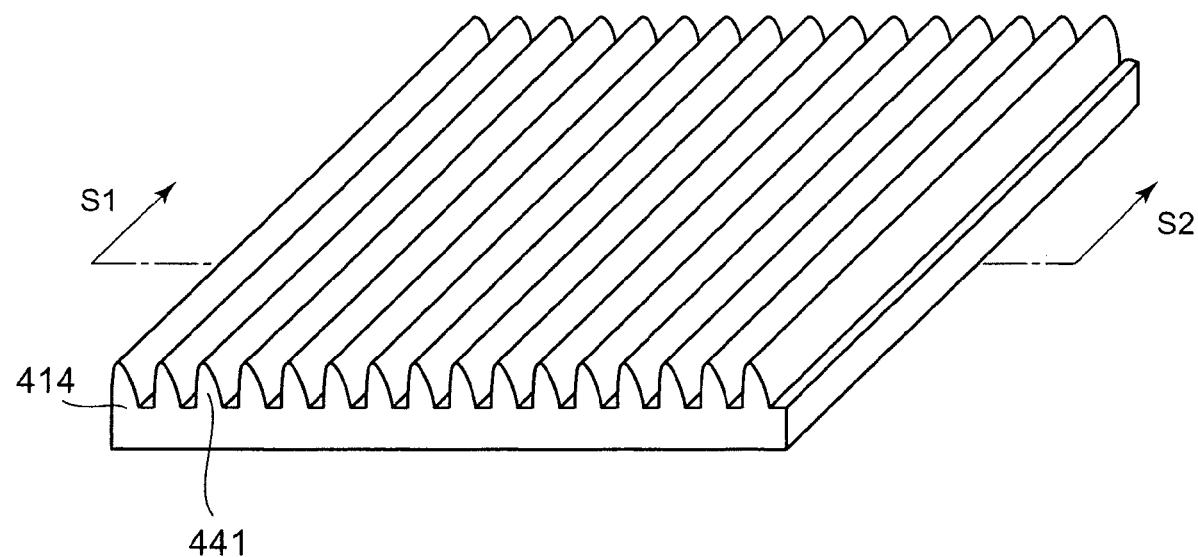
FIG. 11 is a perspective view showing the structure of the light-controlling sheet (of the fourth embodiment) shown in FIG. 10.

FIG. 11 is a perspective view of the light-controlling sheet 414 shown in FIG. 10. The light-controlling sheet 414 has, on the light-exiting side, rod-like (rod-shaped) unit lenses 441 for converging light, as shown in FIG. 11. These unit lenses 441 reduce the non-uniformity of intensity of light emitted from the light-emitting tubes 413 to make the intensity of the light uniform. The lens surface of each unit lens 441 is a combination of parts of two cylindroid (elliptic cylindrical) surfaces. A large number of such unit lenses 441 are arranged in parallel on the light-exiting-side surface of the light-controlling sheet 414. In this embodiment, the direction in which the unit lenses 441 are arranged is the same as the direction in which the light-emitting tubes 413 are arranged (see FIG. 10).

The light-controlling sheet 414 of this embodiment is made from transparent PMMA (acrylic resin) with a refractive index of 1.49 by extrusion. Not only PMMA but also a resin selected from other thermoplastic resins having light transmission properties can be used for the light-controlling sheet 414. Alternatively, the light-controlling sheet 414 may be made by a method called UV molding, using an ultraviolet-curing resin.

Figure 12:
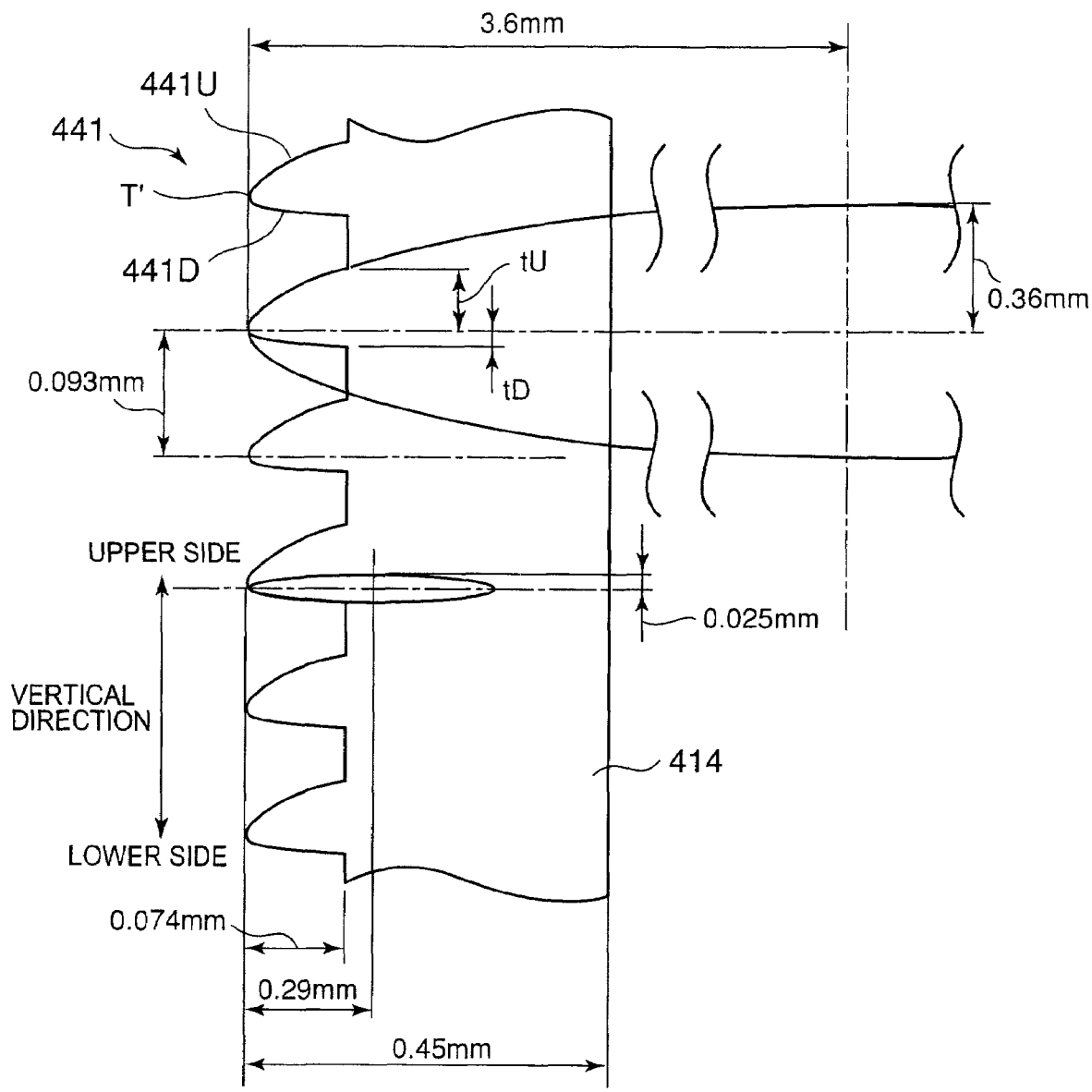
FIG. 12 is a sectional view of the light-controlling sheet shown in FIG. 11, taken along line S1-S2 of FIG. 11.

FIG. 12 is a sectional view of the light-controlling sheet 414 shown in FIG. 11, taken along line S1-S2 of FIG. 11. Shown in this figure is a cross section of the light-controlling sheet 414 that is placed in an upright position like at the time it is used. Namely, the vertical direction in the figure is the direction in which the light-controlling sheet 414 is retained while it is used. Further, the left-hand side in the figure is the light-exiting side.

As shown in FIG. 12, the upper surface part 441U of the lens surface is in the shape of part of the surface of a cylindroid (elliptic cylinder) with a major axis of 3.6 mm and a minor axis of 0.36 mm. The major axis of this cylindroid (elliptic cylinder) is perpendicular to the sheet plane of the light-controlling sheet 414.

On the other hand, the lower surface part 441D of the lens surface is in the shape of part of the surface of a cylindroid (elliptic cylinder) with a major axis of 0.29 mm and a minor axis of 0.025 mm, as shown in FIG. 12. The major axis of this cylindroid is perpendicular to the sheet plane of the light-controlling sheet 414.

The upper surface part 441U and the lower surface part 441D are smoothly connected together by the apex T'. The height of the lens surface, the distance between the deepest level and the apex T', is 0.074 mm. The total thickness of the light-controlling sheet 414 is 0.45 mm, and the unit lenses 441 are arranged with a pitch of 0.093 mm.

Figure 13:
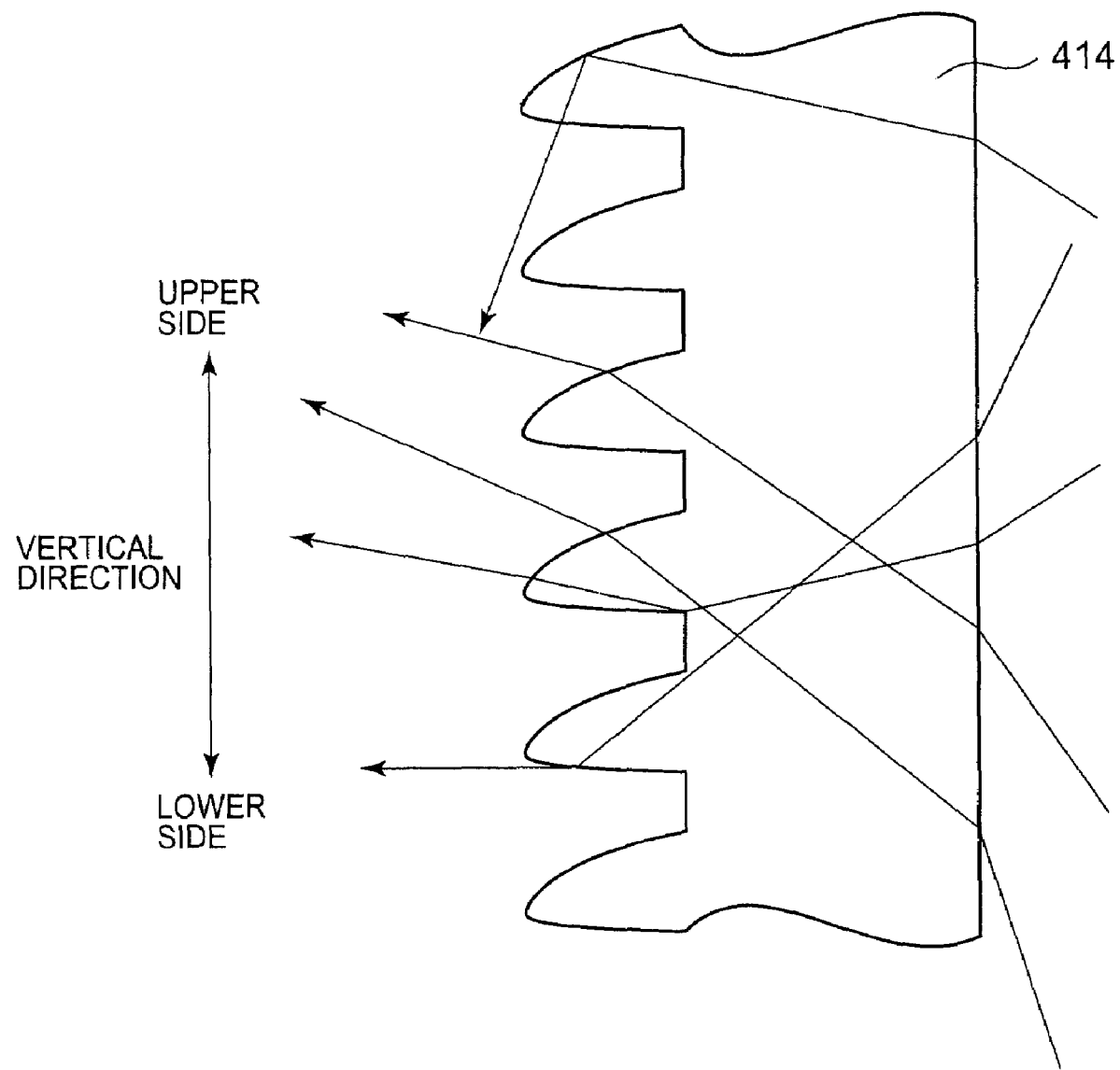
FIG. 13 is a view showing how light beams incident on the light-controlling sheet shown in FIG. 11 travel.

FIG. 13 is a view showing how light beams incident on the light-controlling sheet 414 travel. As in FIG. 12, shown in FIG. 13 is a cross section of the light-controlling sheet that is put in an upright position like at the time it is used.

In the unit lens 414 in the above-described shape, the vertical height tU of the upper surface part 441U is greater than the vertical height tD of the lower surface part 441D. Therefore, the light-controlling sheet 414 can deflect a large part of incident light upward or to the front.

Figure 14:
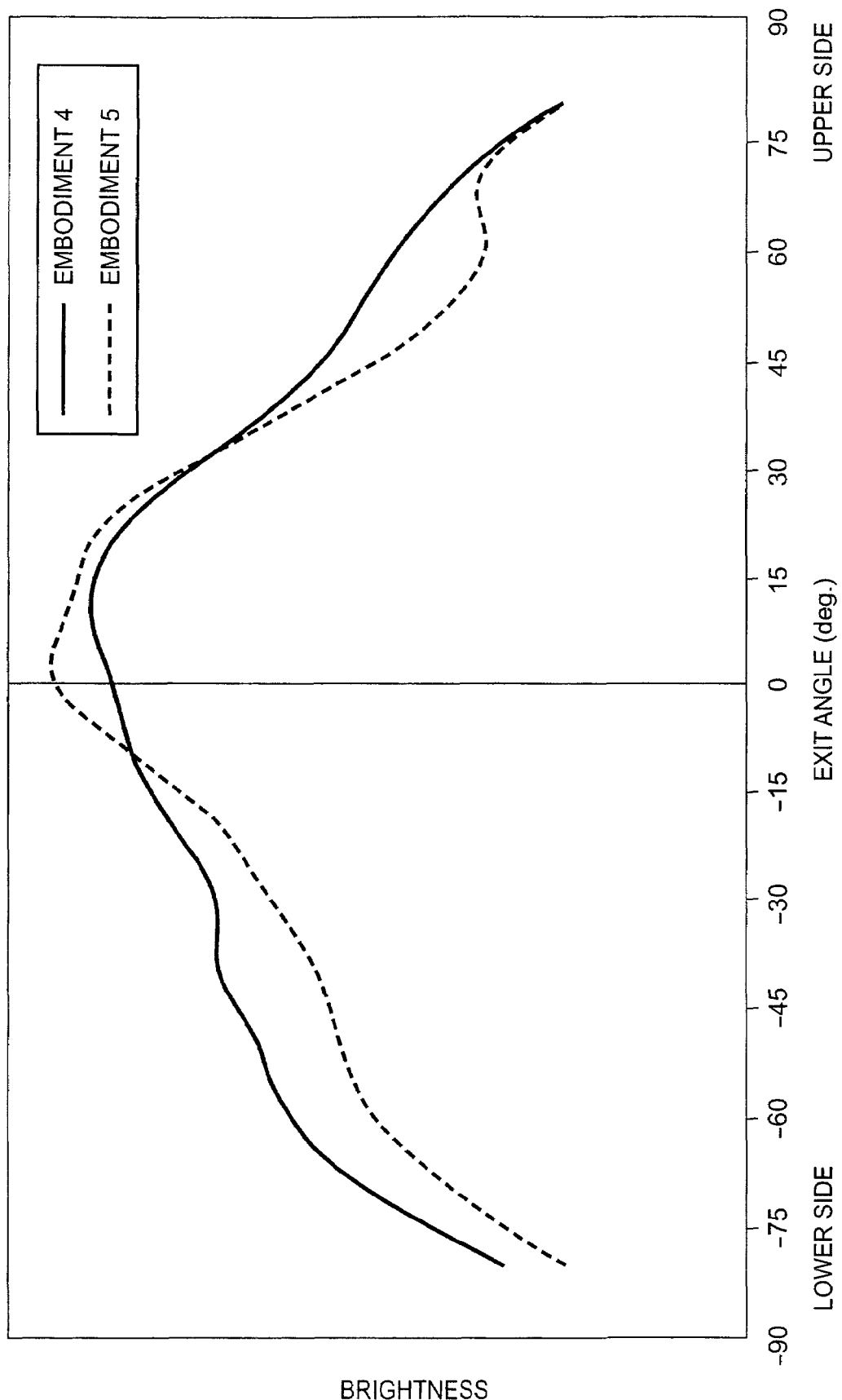
FIG. 14 is a diagram showing the distributions of intensities of illumination light immediately after passing through respective light-controlling sheets.

FIG. 14 is a view showing the distribution of the intensities of illumination light immediately after passing through the light-controlling sheet 414 (and a light-controlling sheet 614 that will be described later). As shown in this figure, the light-controlling sheet 414 (or 614) makes the position of the intensity peak of the illumination light emitted from the light-emitting tubes 413 shift to the upper side, and the high brightness range thus becomes wider on the upper part than on the lower part of the light-controlling sheet.

(Evaluation)

Experiments were carried out in order to compare the surface illuminant unit for use in the above-described transmission type display 410 (the reflective polarizer (DBEF) 415 and the LCD panel 411 excluded) with a conventional surface illuminant unit and a comparative surface illuminant unit.

When the surface illuminant unit containing the light-controlling sheet 414 was used, there was obtained brightness 10% higher than that obtained when a conventional surface illuminant unit composed of a non-directional diffuser plate, a matte film, and a brightness enhancement film BEF (manufactured by Sumitomo 3M Limited, Japan) was used. Further, the surface illuminant unit containing the light-controlling sheet 414 did not present non-uniformity of brightness, and, moreover, was able to attain reduction in the number of component sheets required. Furthermore, the half angle on the upper part increased by 10°.

On the other hand, in the case of a comparative surface illuminant unit in which a brightness enhancement film BEF for improving brightness at a top angle of 90° on the light-exiting side was used in place of the light-controlling sheet 414, the half angle was approximately 40°, and an unnatural increase in brightness was observed in the exit angle range of 60° or more.

As can be understood from the above description, the surface illuminant unit containing the light-controlling sheet 414 has been improved in the uniformity of illumination light, optical efficiency, and normal brightness. This surface illuminant unit has high optical efficiency and can be produced at low cost.

Further, the surface illuminant unit containing the light-controlling sheet 414 can control the direction in which illumination light exits, thereby shifting the brightness distribution to one side. By using the light-controlling sheet 414 for the vertical control of light in order to separately control the viewing angle characteristics of the upper part of the light-controlling sheet and those of the lower part of the light-controlling sheet, it is possible to obtain a viewing angle more suitable for a television or the like, which is usually viewed from the front or above.

Next, a fifth embodiment of a light-controlling sheet according to the present invention will be described hereinafter. A light-controlling sheet of this embodiment is the same as that of the fourth embodiment, except for the shape of the unit lens. Like reference characters designate like or corresponding parts in the fourth and fifth embodiments, and explanation of such parts already given in the above description will not be repeated in the following description.

Figure 15:
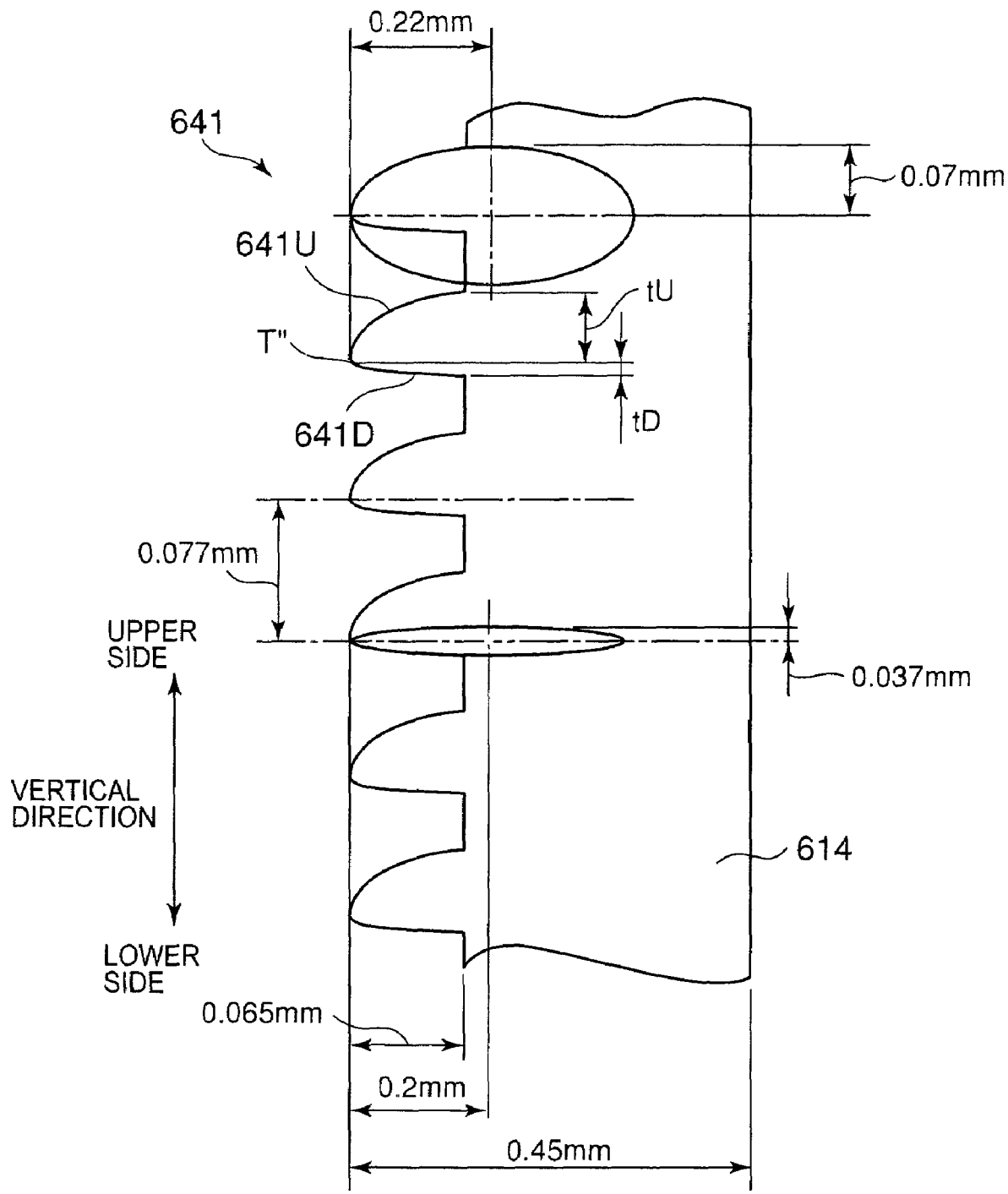
FIG. 15 is a sectional view showing a fifth embodiment of a light-controlling sheet according to the present invention.

FIG. 15 is a sectional view of the light-controlling sheet 614 of this embodiment, taken in the same manner as that in which the sectional view shown in FIG. 12 is taken. Shown in this figure is a cross section of the light-controlling sheet 614 that is placed in an upright position like at the time it is used. Namely, the vertical direction in the figure is the direction in which the light-controlling sheet 614 is retained while it is used. Further, the left-hand side in the figure is the light-exiting side.

As shown in FIG. 15, the upper surface part 641U is in the shape of part of the surface of a cylindroid with a major axis of 0.22 mm and a minor axis of 0.07 mm. The major axis of this cylindroid is perpendicular to the sheet plane of the light-controlling sheet 614.

On the other hand, the lower surface part 641D is in the shape of part of the surface of a cylindroid with a major axis of 0.2 mm and a minor axis of 0.037 mm, as shown in FIG. 15. The major axis of this cylindroid is perpendicular to the sheet plane of the light-controlling sheet 614.

The upper surface part 641U and the lower surface part 641D are smoothly connected together by the apex T". The height of the lens surface, the distance between the deepest level and the apex T", is 0.065 mm. The total thickness of the light-controlling sheet 614 is 0.45 mm, and the unit lenses 641 are arranged with a pitch of 0.077 mm.

The above-described FIG. 14 also shows the distribution of the intensities of illumination light immediately after passing through the light-controlling sheet 614 of the fifth embodiment.

As shown in FIG. 14, the light-controlling sheet 614 makes the position of the intensity peak of the illumination light emitted from the light-emitting tubes 413 shift to the upper side, and the high brightness range thus becomes wider on the upper part than on the lower part of the light-controlling sheet 614. In addition, the brightness peak is higher in this embodiment than in the fourth embodiment.

The present invention is not limited to the above-described embodiments (the fourth and fifth embodiments) and is susceptible to modifications without departing from the scope of the appended claims. All changes that come within the meaning and range of equivalency of the claims are therefore embraced in the scope of the invention.

(1) In the above-described embodiments, the light-controlling sheet 414, 614 has unit lenses 441, 641 of one type, arranged on the light-exiting side. The present invention is not limited to this, and unit lenses of two or more types may also be arranged in combination on the light-exiting side, for example.

(2) In the above-described embodiments, one light-controlling sheet 414, 614 is used for the vertical control of light. The present invention is not limited to this. For example, another light-controlling sheet useful for the horizontal control of light may be added. In this case, it is preferred that the additional light-controlling sheet be horizontally symmetrical in light-controlling characteristics.

The invention claimed is:

1. A light-controlling sheet for a planar light source part, for making light emitted from the planar light source part uniform, comprising:

a lens part having a large number of unit lenses arranged in parallel, with a lens surface of each unit lens facing to a light-exiting side of said sheet, a cross section of the lens surface of each unit lens taken perpendicularly to a longitudinal direction of the unit lens being asymmetrical, wherein the lens surface of each unit lens has
an upper surface part in the shape of part of an elliptical cylindroid surface, located on an upper side relative to a vertical direction which is parallel to a light incident side, and
a lower surface part in the shape of part of an elliptical cylindroid surface, located on a lower side relative to the vertical direction,
the upper surface part and the lower surface part are different in a vertical dimension, wherein the upper surface part is greater than the lower surface part in a vertical height taken in a direction in which the unit lenses are arranged in parallel and which is perpendicular to the longitudinal direction of the unit lens, and wherein the upper surface part and the lower surface part are convex with respect to the vertical direction.

2. A surface illuminant unit for illuminating a transmission type display part from a rear side of the transmission type display part, comprising:
a planar light source part having an array of light sources, and
a light-controlling sheet set forth in claim 1.

3. The surface illuminant unit according to claim 2, further comprising, on an observer side of the light-controlling sheet, at least one optical sheet of a type identical with or different from a type of the light-controlling sheet.

4. The surface illuminant unit according to claim 3, wherein
one of the optical sheets placed on the observer side of the light-controlling sheet is a polarized-light-separating sheet.

5. A light-controlling sheet for a planar light source part, for making light emitted from the planar light source part uniform, comprising:
a lens part having a large number of unit lenses arranged in parallel, with a lens surface of each unit lens facing to a light-exiting side of said sheet,
a cross section of the lens surface of each unit lens taken perpendicularly to a longitudinal direction of the unit lens being asymmetrical,
wherein the lens surface of each unit lens has
an upper surface part in a shape of part of a curved surface, located on an upper side relative to a vertical direction which is parallel to a light incident side,
a lower surface part in a shape of part of a curved surface, located on a lower side relative to the vertical direction, and
an apex in a shape of a curved surface, smoothly connecting the upper surface part and the lower surface part, and
wherein the upper surface part, the lower surface part, and the apex are different in curvature radius, wherein the curvature radius of the lower surface part is larger than the curvature radius of the upper surface part and a vertical height of the lower surface part is smaller than a vertical height of the upper surface part, and
wherein each of the upper surface part, the lower surface part and the apex are convex with respect to the vertical direction.

6. The light-controlling sheet according to claim 5, wherein
the curvature radius of the apex is smallest, and the curvature radius of the lower surface part is greatest.

7. The light-controlling sheet according to claim 6, wherein the curvature radius of the apex is in a range of 0.02 mm to 0.08 mm.

8. The light-controlling sheet according to claim 5, wherein
a pitch P with which the unit lenses are arranged in parallel and a width WT of the apex taken in a direction in which the unit lenses are arranged in parallel and which is perpendicular to the longitudinal direction of the unit lens fulfill following relationships:

$0.05 \text{ mm} < P < 0.5 \text{ mm}$, and $0.025 < WT/P < 0.25$.

9. The light-controlling sheet according to claim 5 made from a thermoplastic resin.

10. A surface illuminant unit for illuminating a transmission type display part from a rear side of the transmission type display part, comprising:
a planar light source part having an array of light sources, and
a light-controlling sheet set forth in claim 5.

* * * * *